(12) United States Patent
Guttinger et al.

(10) Patent No.: US 7,089,717 B2
(45) Date of Patent: Aug. 15, 2006

(54) TRAY LOADER

(75) Inventors: Peter Guttinger, Milton (CA); Petar Baclija, Toronto (CA)

(73) Assignee: Langen Packaging Inc., Ontario (CA)

( * ) Notice: Subject to any disclaimer, the term of this patent is extended or adjusted under 35 U.S.C. 154(b) by 0 days.

(21) Appl. No.: 10/838,214

(22) Filed: May 5, 2004

(65) Prior Publication Data
US 2004/0221549 A1 Nov. 11, 2004

Related U.S. Application Data

(60) Provisional application No. 60/467,605, filed on May 5, 2003.

(51) Int. Cl.
B65B 5/10 (2006.01)
(52) U.S. Cl. .............. 53/475; 53/448; 53/473; 53/537; 53/539; 53/251
(58) Field of Classification Search ........... 53/443, 53/447, 448, 473, 475, 531, 534, 537, 538, 53/539, 540, 250, 251, 252, 152, 153; 198/429, 198/431, 432, 435, 463.3
See application file for complete search history.

(56) References Cited

U.S. PATENT DOCUMENTS

| | | | |
|---|---|---|---|
| 3,295,656 A * | 1/1967 | Benier | 198/429 |
| 3,410,052 A * | 11/1968 | Johnson et al. | 198/429 |
| 3,499,555 A * | 3/1970 | Gunter | 198/429 |
| 3,570,209 A * | 3/1971 | Salwasser | 53/447 |
| 3,802,154 A * | 4/1974 | Dillon | 53/540 |
| 4,154,043 A | 5/1979 | Heide | |
| 4,254,604 A | 3/1981 | Vogel et al. | |
| 4,333,297 A | 6/1982 | Kuttenbaum et al. | |
| 4,429,512 A | 2/1984 | Pegon, Jr. | |
| 4,429,864 A | 2/1984 | Scarpa et al. | |
| 4,434,602 A | 3/1984 | Culpepper | |
| 4,468,163 A | 8/1984 | King et al. | |
| 4,479,345 A | 10/1984 | Nord | |
| 4,506,493 A | 3/1985 | Horton | |
| 4,562,692 A | 1/1986 | Scarpa et al. | |
| 4,582,315 A | 4/1986 | Scarpa et al. | |
| 4,633,653 A * | 1/1987 | Roberts et al. | 53/534 |
| 4,642,975 A | 2/1987 | Langen et al. | |
| 4,864,801 A * | 9/1989 | Fallas | 53/448 |
| 4,939,891 A * | 7/1990 | Podini | 53/537 |
| 5,038,916 A * | 8/1991 | Quilliou | 198/429 |
| 5,052,544 A | 10/1991 | Anderson | |
| 5,096,371 A | 3/1992 | Mojden et al. | |
| 5,133,446 A * | 7/1992 | Draghetti | 198/429 |
| 5,241,806 A | 9/1993 | Ziegler et al. | |
| 5,517,798 A | 5/1996 | Klopfenstein | |
| 5,544,466 A | 8/1996 | Bonnet | |
| 5,553,441 A | 9/1996 | Ivansco, Jr. et al. | |
| 5,561,968 A | 10/1996 | Palmer | |

(Continued)

*Primary Examiner*—Louis Huynh
(74) *Attorney, Agent, or Firm*—Antonelli, Terry, Stout and Kraus, LLP.

(57) ABSTRACT

A method of loading a tray with at least one layer of items includes forming a plurality items into a group of items, moving the first group in a first generally horizontal direction so that the items are received through a top opening of the tray to form a layer of items that at least partially covers the upper surface of said base. The method also includes moving the tray loaded with the group of items in a generally vertical direction. The vertical direction may be downward. The tray may then be moved again in a horizontal direction. Also a system is provided to perform the aforesaid method.

56 Claims, 32 Drawing Sheets

U.S. PATENT DOCUMENTS

| | | |
|---|---|---|
| 5,611,193 A | 3/1997 | Farrelly |
| 5,768,856 A | 6/1998 | Odenthal |
| 5,787,680 A | 8/1998 | Tisma et al. |
| 5,855,105 A * | 1/1999 | Ferris .......................... 53/534 |
| 5,910,078 A | 6/1999 | Guttinger et al. |
| 6,684,611 B1 * | 2/2004 | Cassoli ........................ 53/537 |

* cited by examiner

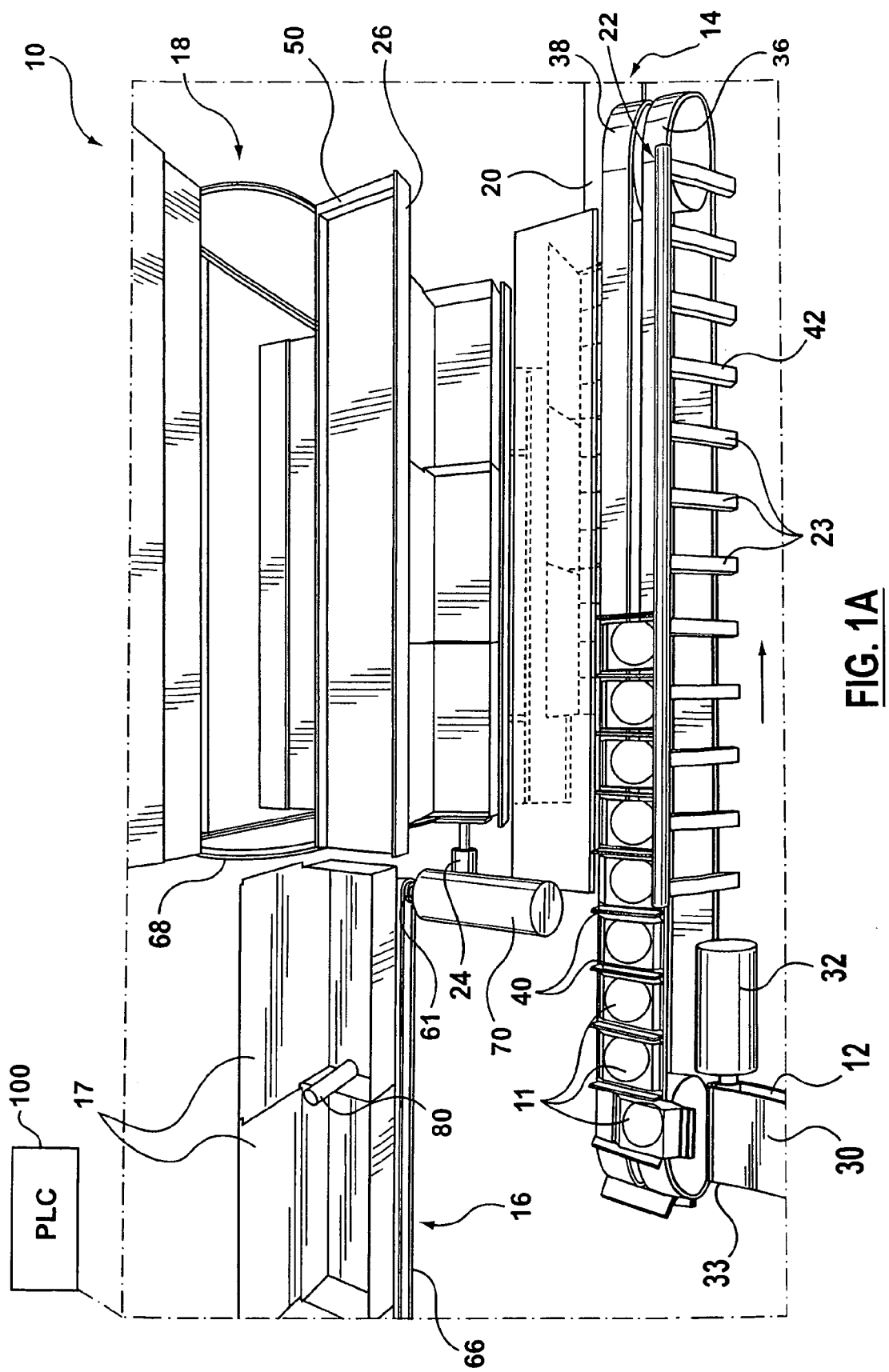

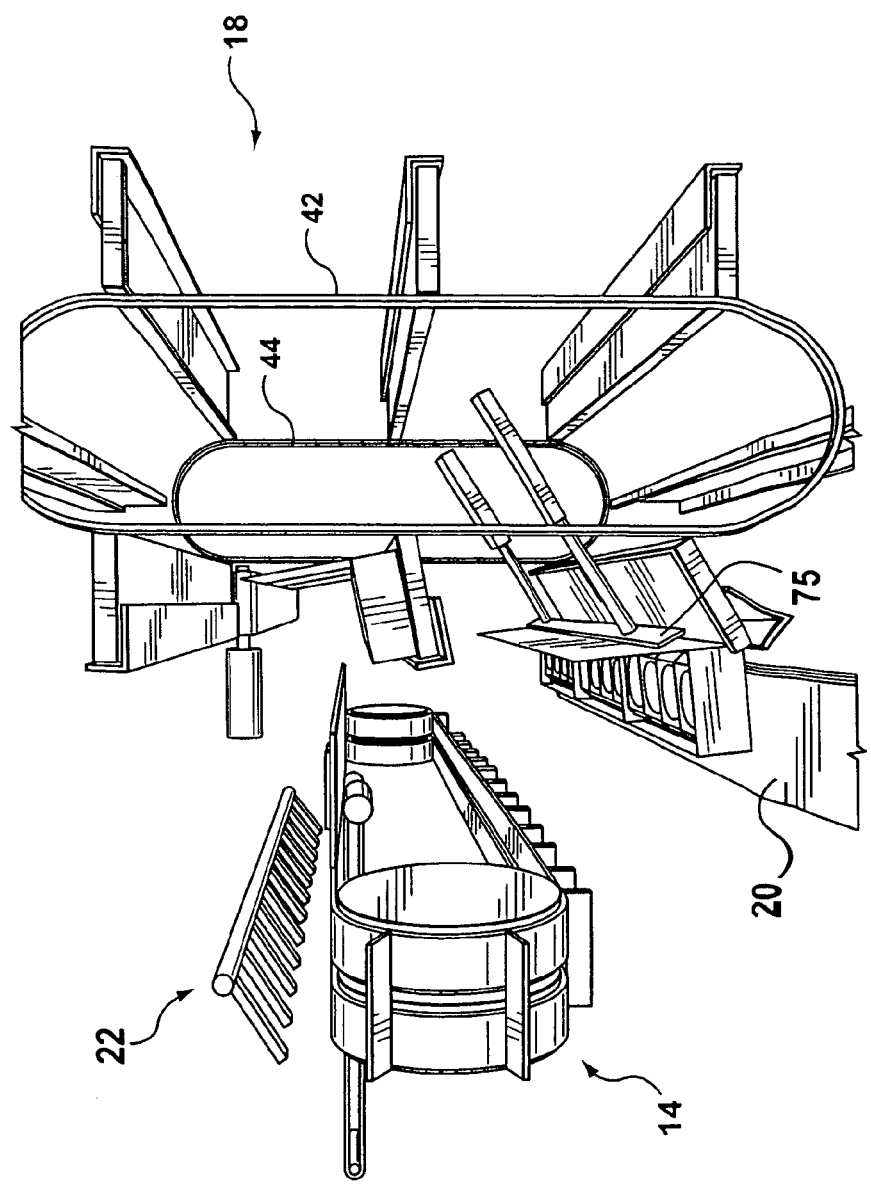

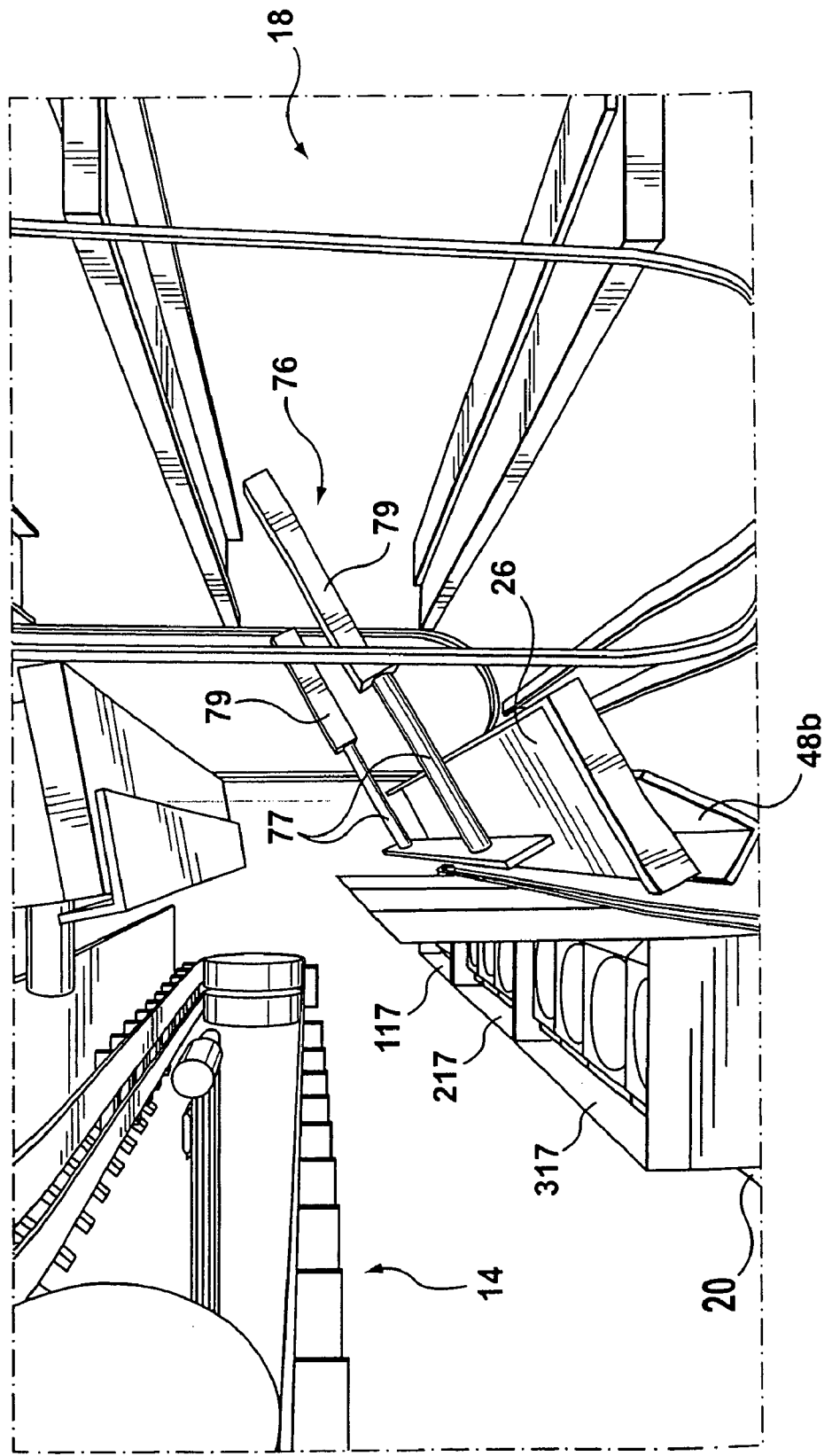

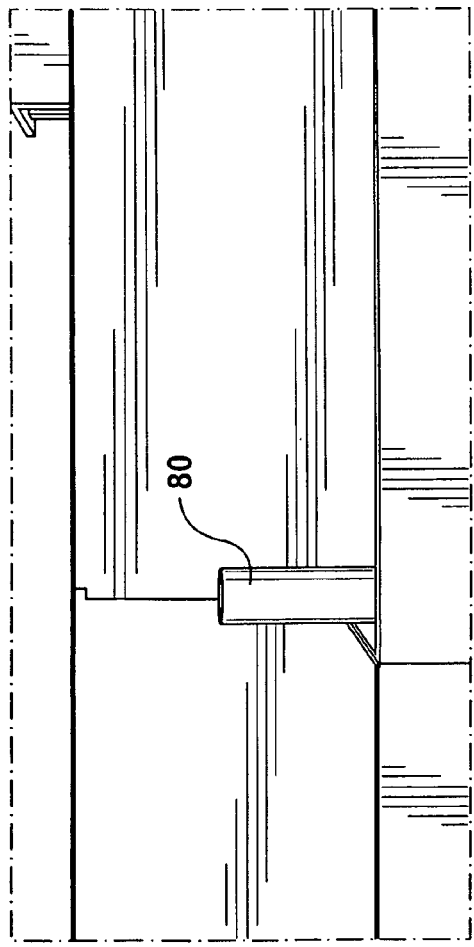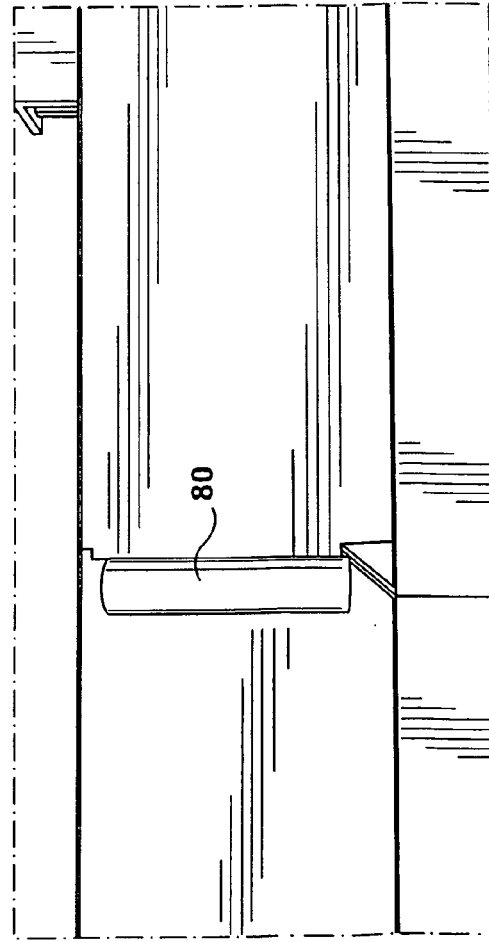

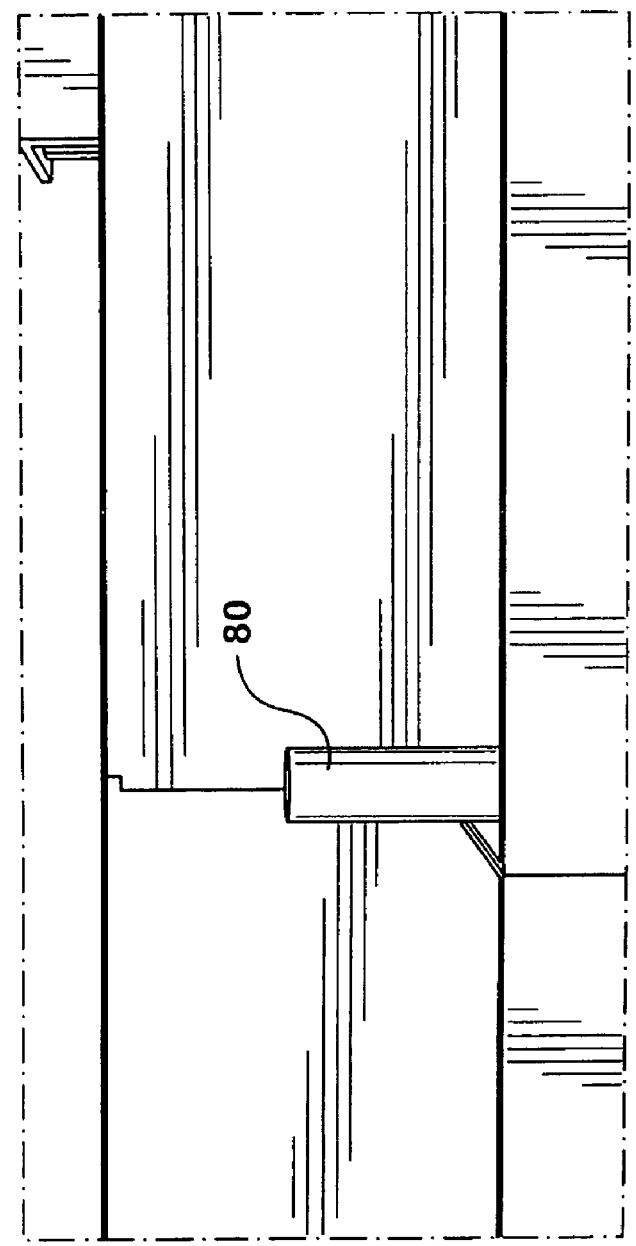

TRAY LOADER

CROSS REFERENCE TO RELATED APPLICATIONS

This application claims the benefit of U.S. Provisional Patent Application No. 60/467,605 filed May 5, 2003, the contents of which are hereby incorporated herein by reference.

FIELD OF THE INVENTION

The present invention relates to the loading of trays with one or more layers of items.

BACKGROUND OF THE INVENTION

It is desirable in the packaging industry to be able to load several items as a layer of items into a tray having a top opening (i.e. items can be loaded from above downwards onto the base of the tray to provide a layer of items that at least partially cover the upper surface of the base). It is also desirable to be able to load the tray with more than one layer of such items.

For example, in the food industry, it is well known to have a tray having multiple layers of cookies, each layer comprising several cookies.

To be able to facilitate the loading of the trays, several items are typically first accumulated together into a group and then loaded as a group into an open topped tray.

A known method of loading such trays provides a tray moving in a longitudinal direction on a tray conveyor brought into an adjacent position relative to an item loading conveyor also moving in the same longitudinal direction. If a tray is brought into close proximity to the group of items, the items can be transferred transversely from the moving item loading conveyor into the moving tray carried by the tray conveyor. One difficulty with this type of loading is that if the item conveyor and the carton conveyor continue to move at the same speed in the same horizontal and longitudinal direction, when the items are discharged into the tray transversely they will also move to some degree vertically as they enter the tray from above. Due to the combined transverse, longitudinal and vertical movement, items have a tendency to become improperly oriented when they reach the tray.

One known improved system for loading a tray, is to bring the trays carried on the tray conveyor to a stationary position for loading. The tray can then be loaded while stationary and then be moved again longitudinally by the tray conveyor once the loading has taken place. However, a problem with this method is that if reasonably fast speeds are maintained, to provide a high rate of tray loading, there is a significant acceleration of the tray out of the loading station once the tray has been filled. Depending upon the type of items involved, this can result in the items becoming improperly configured in the tray itself. Thus, this type of system has limits in terms of the type of items that can be loaded in this way and in terms of the maximum speeds and accelerations that can be imparted upon the loaded trays.

It is also known to employ robots having robot arms with end effectors configured for picking up several items at once and then placing them into trays. However, there is a limit to the speed at which robot arms can move. Also they are a relatively complex and expensive solution.

Accordingly, it is desirable to have an improved method and apparatus for loading trays having open tops with a plurality of items.

SUMMARY OF THE INVENTION

According to one aspect of the present invention, there is provided a method of loading a tray with at least one layer of items comprising the steps of forming a plurality of items into a first group of items; moving the first group in a first generally longitudinal horizontal direction; moving the first group in a first generally transverse horizontal direction into a tray; and moving the tray loaded with the first group of items in a generally vertical direction.

According to another aspect of the present invention, there is provided a method of loading first, second and third trays each with at least one layer of items. The trays are generally longitudinally aligned in series. The method comprises the steps of accumulating a plurality of items into a first group; then moving the first group in a first generally longitudinal direction; then moving the first group in a first generally transverse direction such that a plurality of items of the first group are loaded into each of the first, second and third trays; and then moving the first, second, and third trays, each loaded with a plurality of items that had comprised the first group of items in a generally vertical direction.

According to another aspect of the present invention, there is provided a method of loading first and second trays each with at least one layer of items. The trays are generally longitudinally aligned in series. The method comprises the steps of forming a plurality of items into a first group; then moving the first group in a first generally longitudinal horizontal direction; then moving the first group in a first generally transverse horizontal direction such that a plurality of items of the first group are loaded into each of the first and second trays; and then moving the first and second trays, each loaded with a plurality of items that had comprised the first group of items in a generally vertical direction.

According to another aspect of the present invention, there is provided a system for loading a group of items into an open top tray. The system comprises: an item accumulating conveyor operable to collect a plurality of items into a group at an item loading station and transporting the group of items generally horizontally and longitudinally to a tray loading station; a vertical tray delivery conveyor operable to move a tray carried thereon from an item loading position at which items are loaded from the item accumulating conveyor into the tray, generally vertically to a tray unloading position where the tray carrying the group of items is unloaded from the vertical tray delivery conveyor; and an item discharge apparatus operable to discharge the group of items generally transversely from the item accumulating conveyor to a tray held in the vertical tray delivery conveyor when the tray is at the item loading position.

According to another aspect of the present invention, there is provided a method of loading a tray with at least one layer of items comprised of accumulating a plurality items into a first group of longitudinally oriented items; then moving the first group of items in a first generally longitudinal direction; then moving the first group together in a first generally transverse direction into an tray; and then moving the tray loaded with the first group of items in a generally vertical direction.

According to another aspect of the present invention, there is provided a method of loading first and second trays each with at least one layer of items. The method comprises the steps of: a) accumulating a plurality items into a first group and a second group; then b) moving the first group in a first generally longitudinal direction; then c) moving the first group in a first generally transverse direction such that a plurality of items of the first group are loaded into the first tray which is situated at an item loading station; and then d) simultaneously moving the first tray loaded with a plurality of items that had comprised the first group of items in a vertical direction away from the item loading station, and the second tray to the item loading station; e) moving the second group in the first generally longitudinal direction; then f) after (c), moving the second group in the first generally transverse direction such that a plurality of items of the second group are loaded into the second tray which is situated at the item loading station.

According to another aspect of the present invention, there is provided a system for loading a group of items into a tray. The system comprises: an item accumulating conveyor operable to collect a plurality of items into a group oriented longitudinally at an accumulating conveyor loading station and transporting the group of items longitudinally to a tray loading station; a vertical tray delivery conveyor operable to move a tray carried thereon from an item loading position at which items are loaded from the item accumulating conveyor into the tray, generally vertically to a tray unloading position where the tray carrying the group of items is unloaded from the vertical tray delivery conveyor; and an item discharge apparatus operable to discharge the group of items generally transversely from the item accumulating conveyor to a tray held in the vertical tray delivery conveyor when the tray is at the item loading position.

According to another aspect of the present invention, there is provided a system for loading a group of items into a first tray and a second tray. The system comprises: a delivery system operable to deliver a first group of items and a second group of items to a tray loading station; a vertical tray delivery conveyor which is operable to move a first tray carried thereon from an item loading position at the tray loading station, at which first group of items are loaded by the delivery system into the first tray, generally vertically to a tray unloading position where the tray carrying the first group of items is unloaded by the delivery system to the vertical tray delivery conveyor, and the vertical tray delivery conveyor also being operable after the first tray has been loaded with the first group of items, to move the second tray carried thereon to the item loading position at which first group of items are loaded by the delivery system into the second tray, generally vertically to the tray unloading position where the second tray carrying the second group of items is unloaded from the vertical tray delivery conveyor.

According to another aspect of the present invention, there is provided a method of loading a tray with at least one layer of items comprising the steps of: at an accumulating station, accumulating a plurality of items into a first group of longitudinally oriented items; then moving the first group of items in a first direction; then moving the first group of items into a tray; and then moving the tray loaded with the first group of items in a second generally vertical direction.

According to another aspect of the present invention, there is provided a method of loading a tray with at least one layer of items comprising the steps of: loading a tray on a tray support device at a tray loading station; moving the tray with the tray support device from the tray loading station to an item loading station at which a plurality of items are loaded into the tray; and moving the tray with the tray support device generally vertically to a tray discharge station at which the tray is discharged from the tray support device.

According to another aspect of the present invention, there is provided a method of loading a tray with at least one group of items comprising the steps of moving a first group comprised of a plurality of items in a first generally longitudinal horizontal direction; moving the first group in a first generally transverse horizontal direction into a tray; and moving the tray loaded with the first group of items in a generally vertical direction.

According to another aspect of the present invention, there is provided a method of loading a tray with at least one layer of items comprising the steps of accumulating a plurality of items into a first group; moving the first group in a first generally longitudinal horizontal direction; moving the first group in a first generally transverse horizontal direction into a tray; and moving the tray loaded with the first group of items in a generally vertical direction.

According to another aspect of the present invention, there is provided a system for loading a tray with a group of items comprising: means for moving a first group of items comprised of a plurality of items in a first generally longitudinal horizontal direction; means for moving the first group in a first generally transverse horizontal direction into a tray; and means for moving the tray loaded with said first group of items in a generally vertical direction.

According to another aspect of the present invention, there is provided a method of loading a tray with at least one layer of items. The tray has a base with an upper surface, and a top opening. The method comprises the steps of forming a plurality items into a group of items; moving the first group in a first generally horizontal direction so that the items are received through the opening of the tray to form a layer of items that at least partially covers the upper surface of the base; and moving the tray loaded with the group of items in a generally vertical direction.

BRIEF DESCRIPTION OF THE DRAWINGS

In drawings which illustrate by way of example only, an embodiment of the invention:

FIGS. 1A to 1F are top perspective views showing the sequential positions of components in a tray loading system operating through a tray loading cycle;

FIGS. 2A to 2H are corresponding side perspective views showing sequential positions of the tray loading system of FIGS. 1A to 1F operating through the tray loading cycle;

FIGS. 5A to 5C are right side perspective views showing the discharge movement of trays from a tray shelf onto a tray output conveyor, parts of the system of FIGS. 1A to 1F;

FIGS. 6A to 6E are schematic views illustrating the sequential movement of a tray retaining element, part of the system of FIGS. 1A to 1F, operating through a tray loading cycle.

DETAILED DESCRIPTION

Figure 1B:
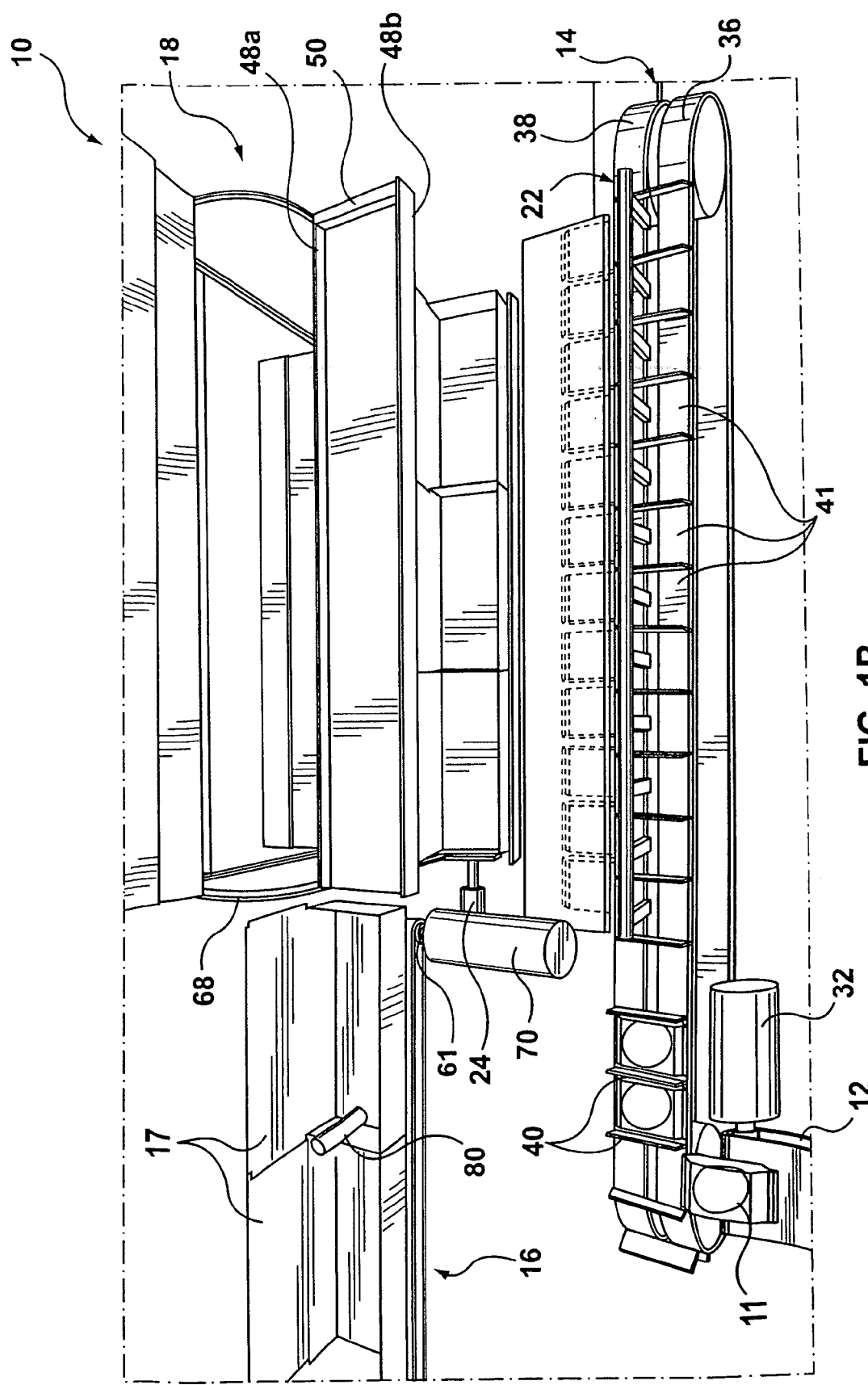
Figure 2A:
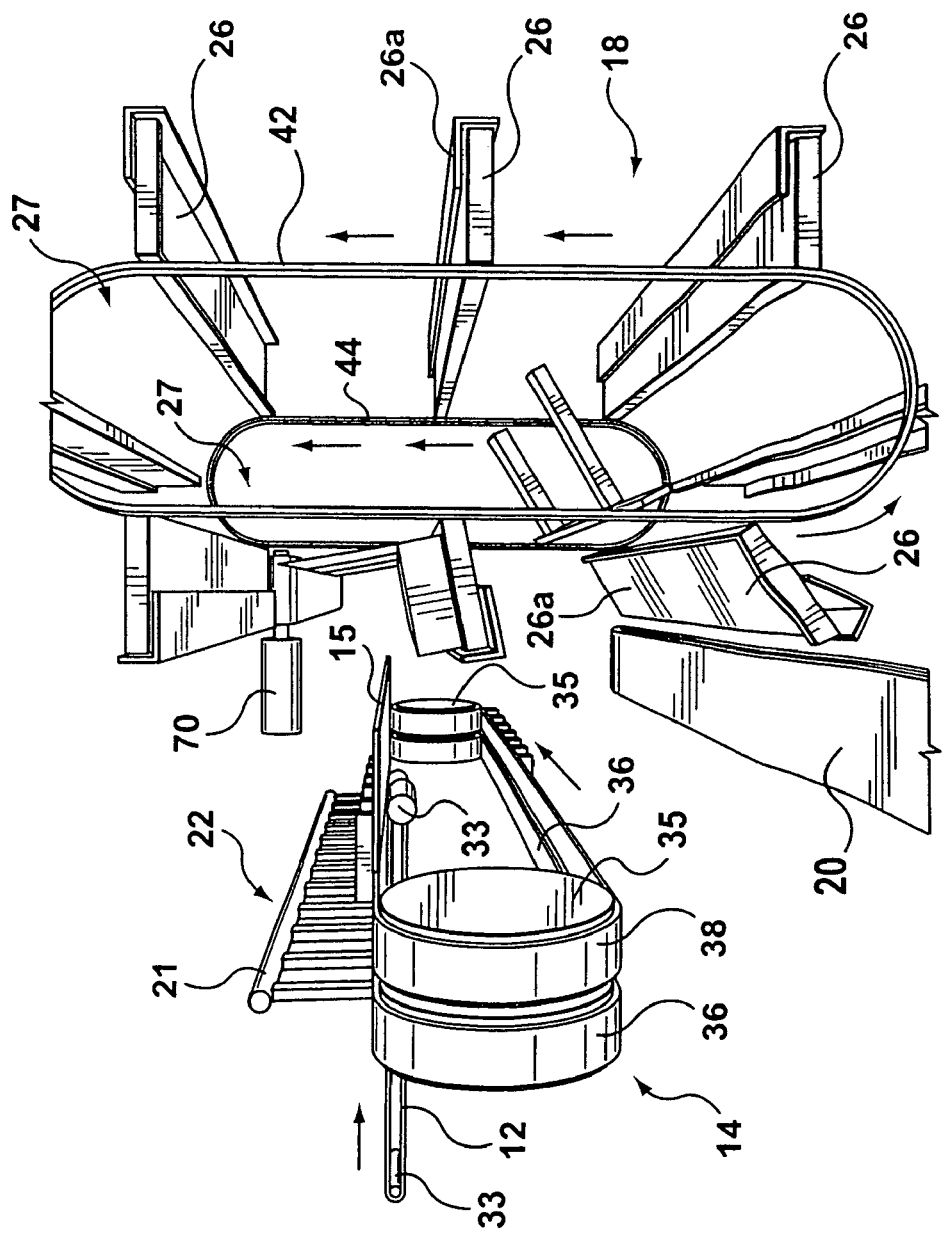

With reference initially to only FIGS. 1A and 2A, a tray loading system 10 is used to load trays generally designated 17 with two layers of items 11, each layer can have a plurality of items 11. Items 11 can be any kind of item it is desired to arrange in a layer in the tray, and can include but not be limited to food items such as muffins, cookies and the like. Trays 17 may be any item retaining device having a base portion that is generally flat and a generally, but not necessarily completely, open top portion, through which items can be loaded onto the base to provide a first layer of items that at least partially cover the upper surface of the base. Additional layers of items can be placed on top of the first layer.

Trays 17 will typically, but not necessarily have a base, and side walls upstanding all around, from the base. The side walls can be relatively high compared to the width and length of the base, but will usually be relatively shallow in comparison to the aforesaid width and length of the base. The base is sometimes, but not necessarily, generally flat. However, the base may be uneven, and could for example, provide for slots or indentations or the like to retain items in a layer.

The open portion at the top may have a folding top panel, or some other type of closure device or lid, to enclose items loaded through the open top, in the tray. Trays 17 can be made of any type of suitable material for holding the items, including but not limited to plastics, relatively stiff paper material or cardboard.

System 10 as illustrated, has several components, including an item input conveyor 12, an item accumulating conveyor 14, a tray input conveyor 16, a vertical tray delivery conveyor 18 and a tray output conveyor 20.

The system also includes an item discharge apparatus 22 for discharging items 11 from item accumulating conveyor 14 into trays 17, as well as a tray positioning apparatus 24 (see in particular FIGS. 3A, 3B, 3C and 3D).

Item input conveyor 12 can be a continuous motion belt-driven conveyor having a continuous belt 30 supported on either end by one or more rollers 33, one or more of which will be driven by a conveyor motor 32, and can be constructed in a known manner. Item input conveyor 12 can be configured to continuously deliver items 11 singly in series to an accumulating station at which is located an item input for item accumulating conveyor 14. In other example embodiments (not shown) it is possible to deliver items in stacks of two or more items.

A plurality of items can be formed into groups. For example, as shown in FIG. 2A, item accumulating conveyor 14 has a first continuous conveyor belt 36 supported at either end by rollers 37 and a second continuous conveyor belt 38, also supported by rollers 35. Belts 36 and 38 are mounted parallel and adjacent to each other, and can be driven independently of each other by separate servo-motors (not shown) or other known conveyor belt driving mechanisms, and can be constructed in a known manner. Belts 36 and 38 can move independently of each other, and can move intermittently and at varying speeds. Also as shown, each belt 36, 38 can have a set of spaced flight members, in one example embodiment, thirteen spaced flight members 40, provide and define therebetween a total of twelve cavities 41. Each cavity 41 can be configured for receiving and holding an item 11 (see FIGS. 1A and 1B). Flights 40 or other item holding devices can be mounted to the belts 36, 38 in conventional known ways. Although the flights 40 of each belt 36, 38 extend transversely across the other of the belts 36, 38, each set of thirteen flights 40 is only interconnected to one of belts 36, 38. Thus, each of the sets of flights 40 can be moved independently of the other set of flights 40, by their respective belts.

Positioned generally adjacent to belts 36, 38 and located between the belts and vertical conveyor 18, is an item supporting platform 15 (FIG. 2A) which can be supported by a frame (not shown). Platform 15 has an upper surface that is located generally parallel to and is located at the same vertical height as the upper surface of the upper run of belts 36, 38. Thus, items moved transversely by item discharge apparatus 22 from belts 36, 38 will be moved onto platform 15, before being pushed over the edge of platform 15 to fall into an open topped tray 17.

As illustrated, item discharge apparatus 22 may be configured with a plurality of depending fingers 23 (FIG. 1A), each for engaging a cavity 41 of a set of flights 40 carried by belts 36 and 38. Item discharge apparatus 22 can be provided with finger elements 23 depending outward from a main support rod 21 (FIG. 2A). Apparatus 22 can employ a transverse sweeping action capable of sweeping items 11 out from cavities 41 formed between flight members 40 into open-topped trays 17 carried by vertical tray conveyor 18. During the sweeping movement to push items into trays 17, the fingers 23 can be oriented downward. On the return movement, as shown in FIG. 2C, the fingers 23 have been pivoted backwards so that they can pass over flights 41 of belts 36, 38 and not otherwise interfere with the unloading of items 11 from the next set of cavities 41. As part of apparatus 22, a simple overhead conveyor can be mounted with drive chains at either end supporting ends of rod 21. The chains can be configured to provide a path for the rod 21 as shown in FIGS. 2A to 2H. The fingers 23 attached to rod 21 can also be rotated about a longitudinal axis defined by the centre of rod 21 by conventional rotation mechanisms such as a cam follower and cam track configured at either end, similar to the cam follower and track used to rotate wall 48b of shelves 26 as later described. The cam follower can be attached to a bar member attached at an end of rod 21, and engage a track that follows a path which produces a relative rotation of the fingers 23 about the longitudinal axis of rod 21.

Vertical tray conveyor 18 may comprise an endless conveyor having shelf units 26 secured to, and being supported at either end by continuous chains 42 and 44, generally arranged for parallel vertical runs. Although not shown, but as is known in known conveyor systems, chains 42, 44 can be guided by guide tracks to provide the path shown in FIG. 4D. The continuous conveyor chains can be supported for their vertical runs by rollers (not shown) and as shown by arrows in FIG. 2A can be driven in an anti-clockwise direction by a conventional drive mechanism (also not shown). Vertical conveyor 18 can be driven by servo-motors to provide for intermittent motion and movement of varying speed, along the path illustrated, as will be explained in more detail hereinafter.

The movement of the components of system 10 can be controlled by a Programmable Logic Controller (PLC) 100 (FIG. 1A), including the movement of item accumulating conveyor 14, vertical conveyor 18 and item discharge apparatus 22 so as to effect the operational movements described in greater detail below. Additionally, although item conveyor 12 and tray input conveyor 16 can be operated continuously at a constant speed, alternatively they can be driven at varying speeds and intermittently by for example servo-motors, with the movement being controlled by PLC 100. Various sensors can be provided in the system and be interconnected to PLC 100. Such sensors can be used to assist in ensuring the proper sequence of operation of the various components and also be configured to identify if there are certain types of problems with the operation of the system 10. For example, if a problem is identified, conveyor 12 can be stopped, to temporarily prevent the continuous feeding of items to the accumulating conveyor 14. A sensor can be placed between infeed conveyor roller 33 and accumulating conveyor 14. Such a sensor can be a beam sensor which emits a beam and so can, by interruption of the beam, sense if the gap between the infeed conveyor roller and conveyor 14 is blocked for an extended period of time. This beam sensor can be in communication with PLC 100 and can be configured to provide a signal to PLC 100 when the gap is blocked. It the gap is blocked for an improper period of time as measured by the PLC 100 or other timing device, PLC 100 can shut down the system.

Also an electronic eye sensor device (not shown) associated with the item in-feed location of accumulating conveyor 22, can be provided and be in electronic communication with PLC 100. The electronic eye would be able to detect the presence or absence of an item 11 at a cavity 41 positioned at the item in-feed location. Once a cavity 41 located at the in-feed location has been filled, the electronic eye can detect the same and send a signal to PLC 100. The PLC 100 can then control the movement of accumulating conveyor 14, either to index belt 36 or 38 to the next cavity 41 if not all cavities associated with that set of flights have been filled, or if all cavities are filled to move the respective belt 36 or 38 so that the group of items held in the flights 40 of that belt can be positioned adjacent to item discharge apparatus 22.

Figure 4A:
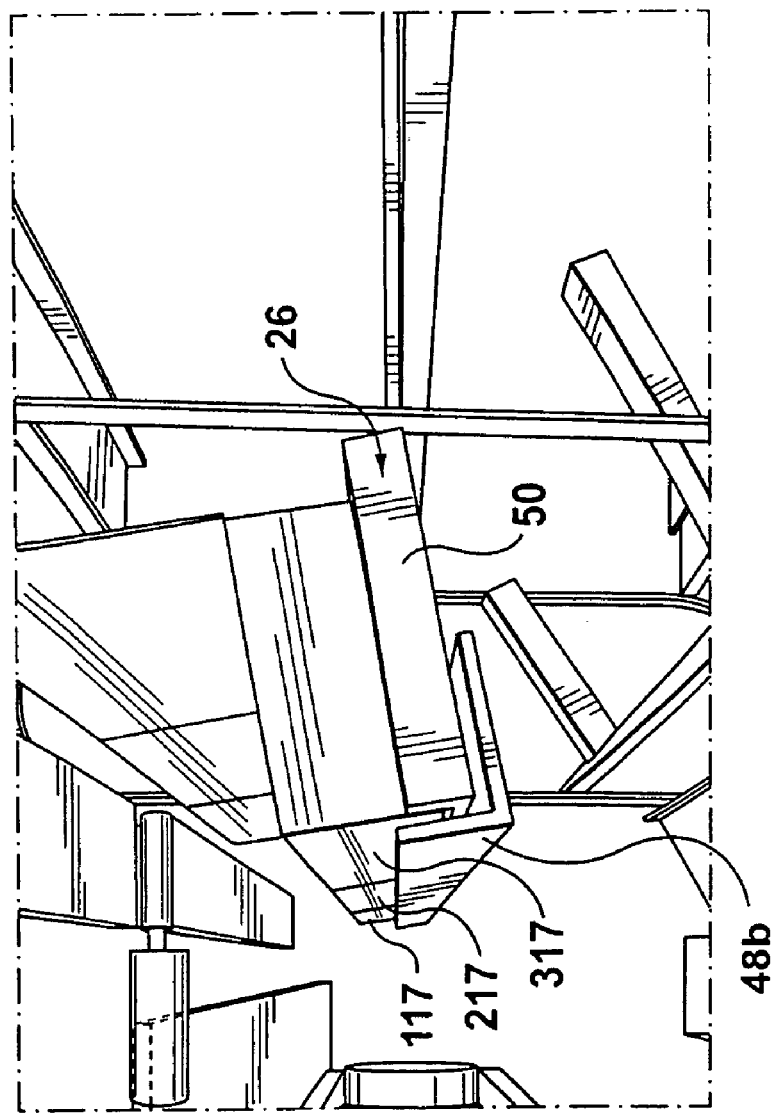
FIGS. 4A and 4B are bottom, right side, close-up perspective views showing the movement of a tray retaining wall employed on a tray shelf, which are parts of the system of FIGS. 1A to 1F.
Figure 4B:
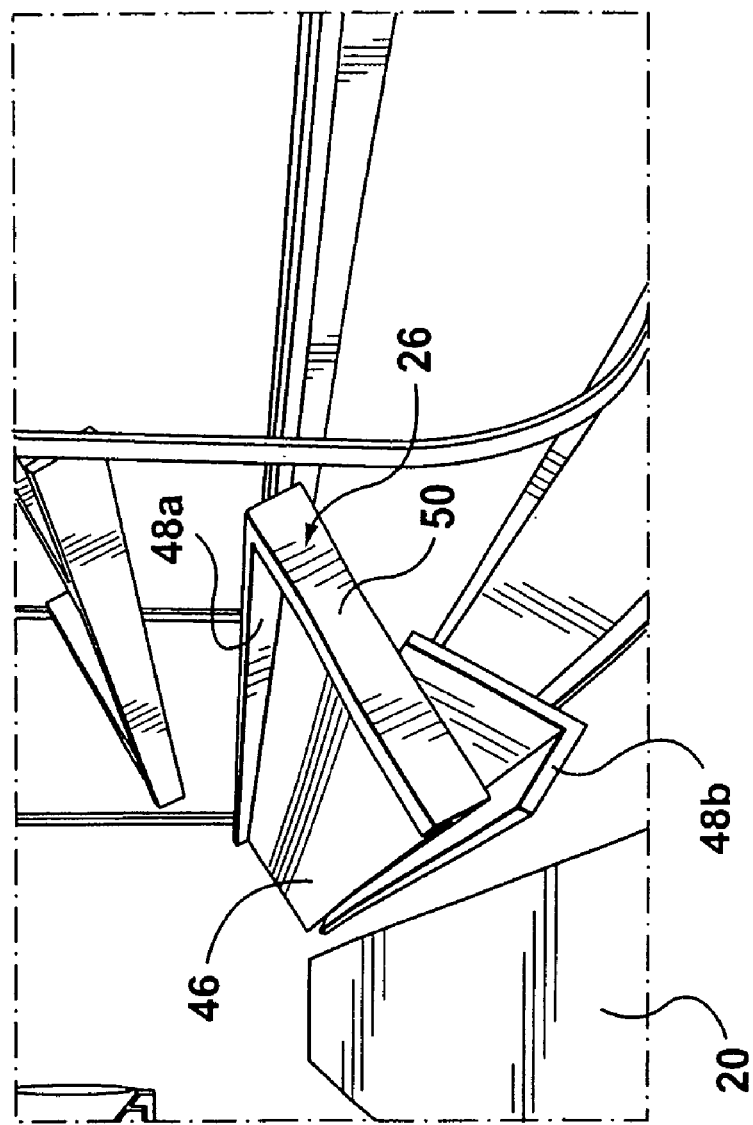

With particular reference now to FIGS. 4A and 4B, shelf units 26 of vertical conveyor 18 are shown in detail. Each shelf unit 26 is comprised of a base portion 46, with upstanding longitudinal side walls 48a, 48b and a single, upstanding end wall 50. Walls 48a, 48b and 50 of shelves 26 are configured to receive from an opposite end to end wall 50, and then hold, three trays 17 in end-to-end, longitudinally oriented relationship. Shelf units are typically fixedly mounted at their ends to chains 42, 44 and so rotate with chains around the conveyor path of vertical conveyor 18. However, as will be evident from the description below, the shelves 26 are configured for a limited degree of rotation about a longitudinal axis relative to chains 42, 44 facilitated by pivot connections of shelves 26 to chains 42, 44. The shelves 26 rotate relative to the chains, about a longitudinal axis when they move from the tray loading position (FIGS. 2A–2E) to the tray unloading position (FIGS. 2G and 2H).

Figure 4C:
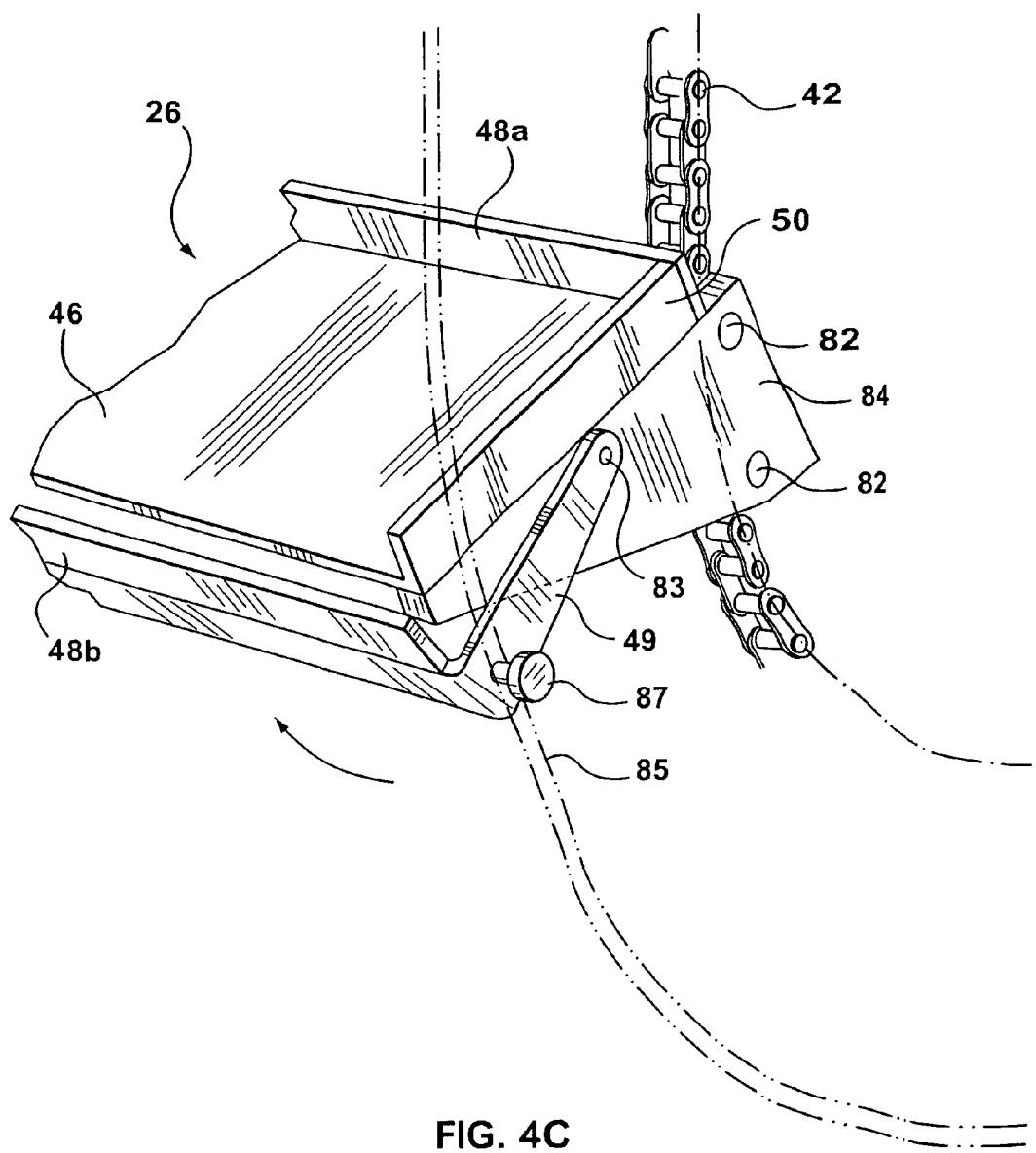
FIG. 4C is an enlarged detail view of part of FIG. 4A, showing the connection of the shelf and the tray retaining wall.
Figure 4D:
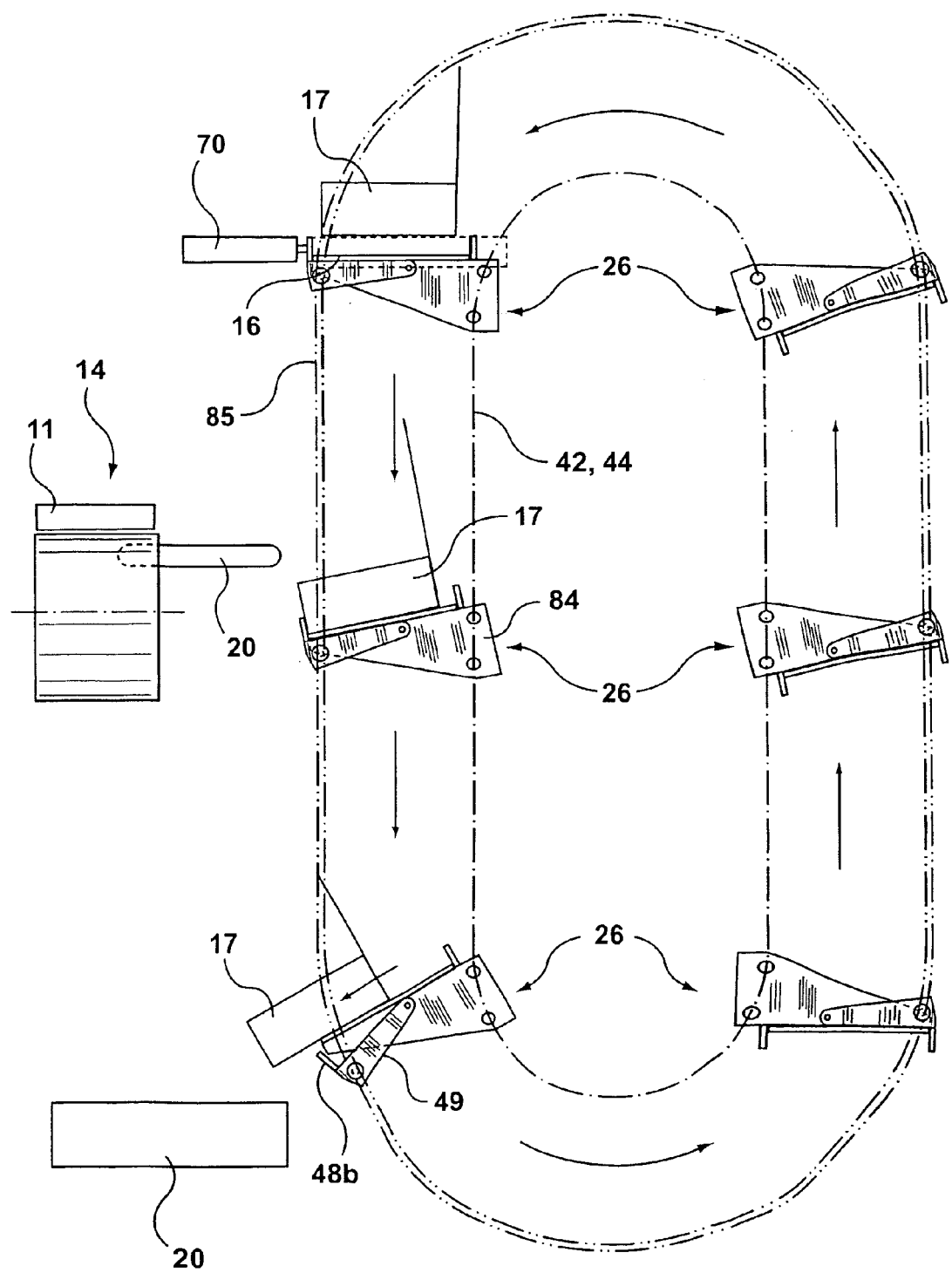
FIG. 4D is a view similar to FIGS. 2A to 2F showing in more detail the orientation trays on the vertical conveyor through the tray loading cycle.

Side wall 48a is fixedly attached to or formed with base 46 and is upstanding from base 46. However, side wall 48b is formed from a longitudinally extending L-bracket member which is movable relative to shelf base 46, between an extended, tray holding position (as shown in FIG. 4A) and a retracted, tray release position (as shown in FIGS. 4B and 4C). As shown in further detail in FIG. 4C, the end of each shelf can be attached to a chain 42 (chain 44 at opposite end of the shelf) by way of a plate member 84. Plate member 84 can be attached to base 46 with conventional attachment mechanisms or integrally formed therewith. Plate member 84 can be mounted with nuts and bolts 82 to the chain. It will be noted, as shown in FIG. 4D, that when a tray is at the item receiving position the upper surface of shelf base 46 is sloped downwards a few degrees. Side wall member 48b has arms 49 at both ends (FIG. 4C) which are pivotally mounted for limited rotation about a pin 83. Arms 49 each have a cam follower 87 attached at the front. Vertical tray conveyor 18 also has cam tracks 85 at each end with a groove for receiving the previously mentioned cam followers 87. Driving shelf base 46 with drive chains 42 and 44 around the conveyor track of vertical conveyor 18, will drag cam follower 87 which is engaged in its groove, in the paths as shown in FIG. 4D. The path of the track 85 relative to the chains 42, 44 will then produce relative motion, in particular a rotation, of the side wall 48b around its pivoting point and pivot pins 83. When shelves 26 have to receive trays 17 from conveyor 16, side wall 48b is standing up and in a tray retaining position. When shelves 26 are at discharge position then that side wall 48b is pivoted downwards about pins 83 to allow free side sliding motion of the loaded trays from a shelf 26 onto tray output conveyor 20.

As will be noted in FIGS. 2G and 2H, as each shelf 26 is positioned in the tray release position, whereby the leading longitudinal edge 26a of each tray 26 has rotated anti-clockwise relative to chains 42, 44, the L-bracket member has rotated anti-clockwise relative to base 46 to retract the upstanding wall portion 48b so that it no longer blocks tray 17 from being pushed from shelf 26 by a tray discharge mechanism 76, as is described below.

In FIG. 4A, a shelf 26 carrying loaded trays 117, 217, 317 is being lowered by vertical conveyor 18. Wall portion 48b is in a tray blocking position. In FIG. 4B, tray 26 is shown in the position where it is unloaded from the shelf, with wall portion 48b having been retracted. Trays 117, 217, 317 have already been discharged from shelf 26 onto tray output conveyor 20 and carried away by that conveyor.

Figure 3A:
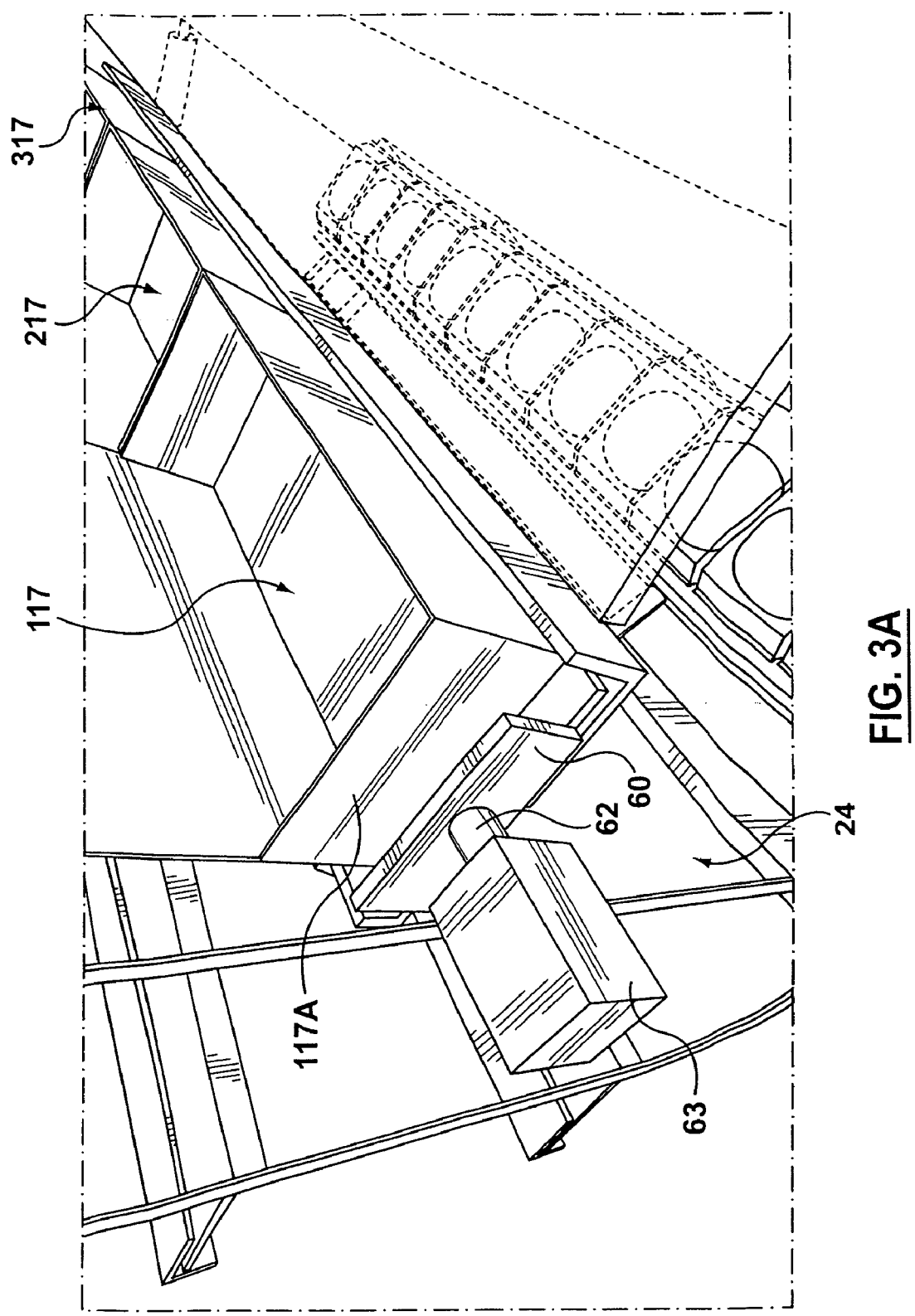
FIGS. 3A to 3D are top, left side, close-up perspective views showing the sequential positions of a tray positioning apparatus, part of the system of FIGS. 1A to 1F, operating through a tray loading cycle.
Figure 3B:
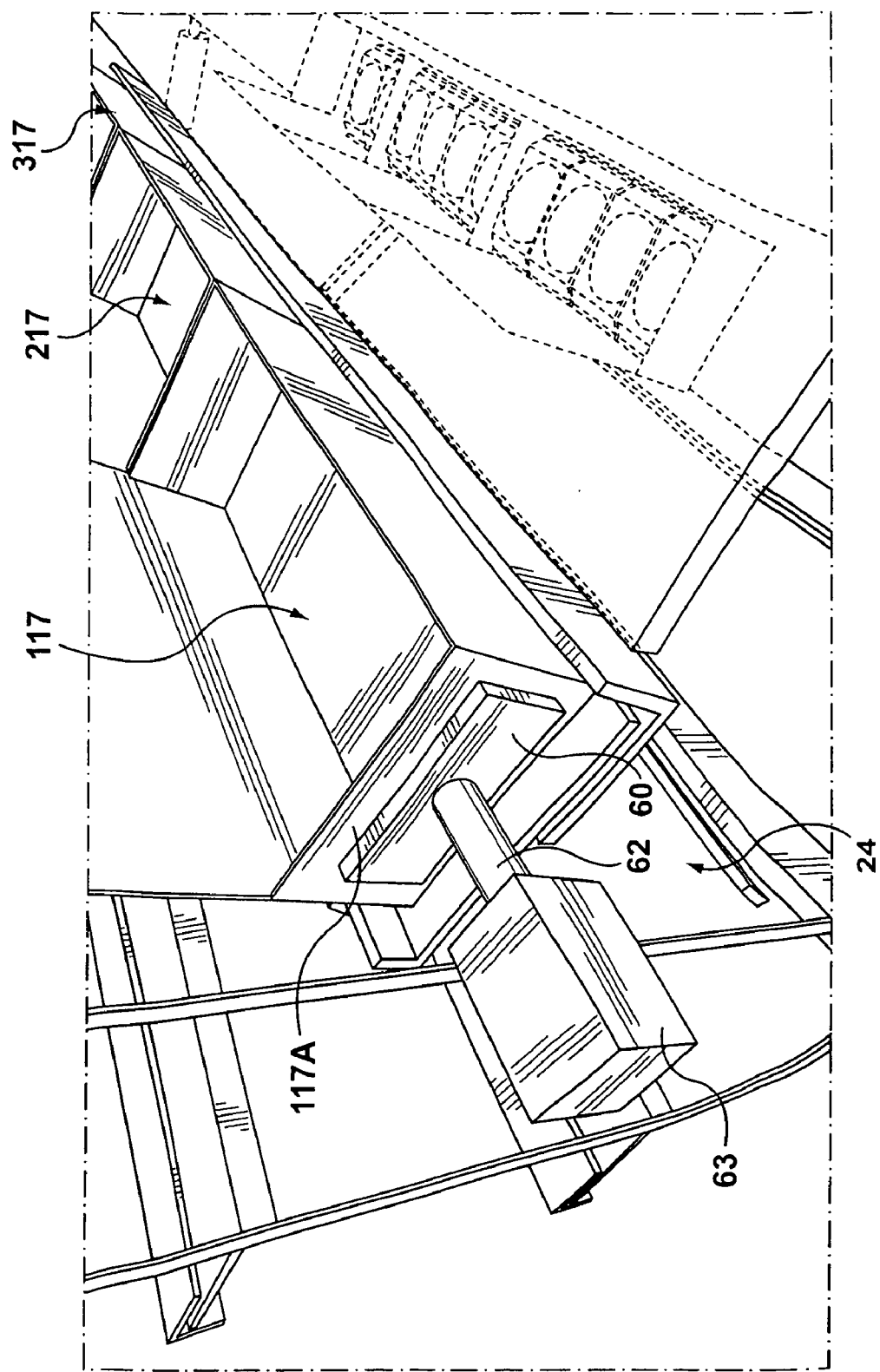
Figure 3C:
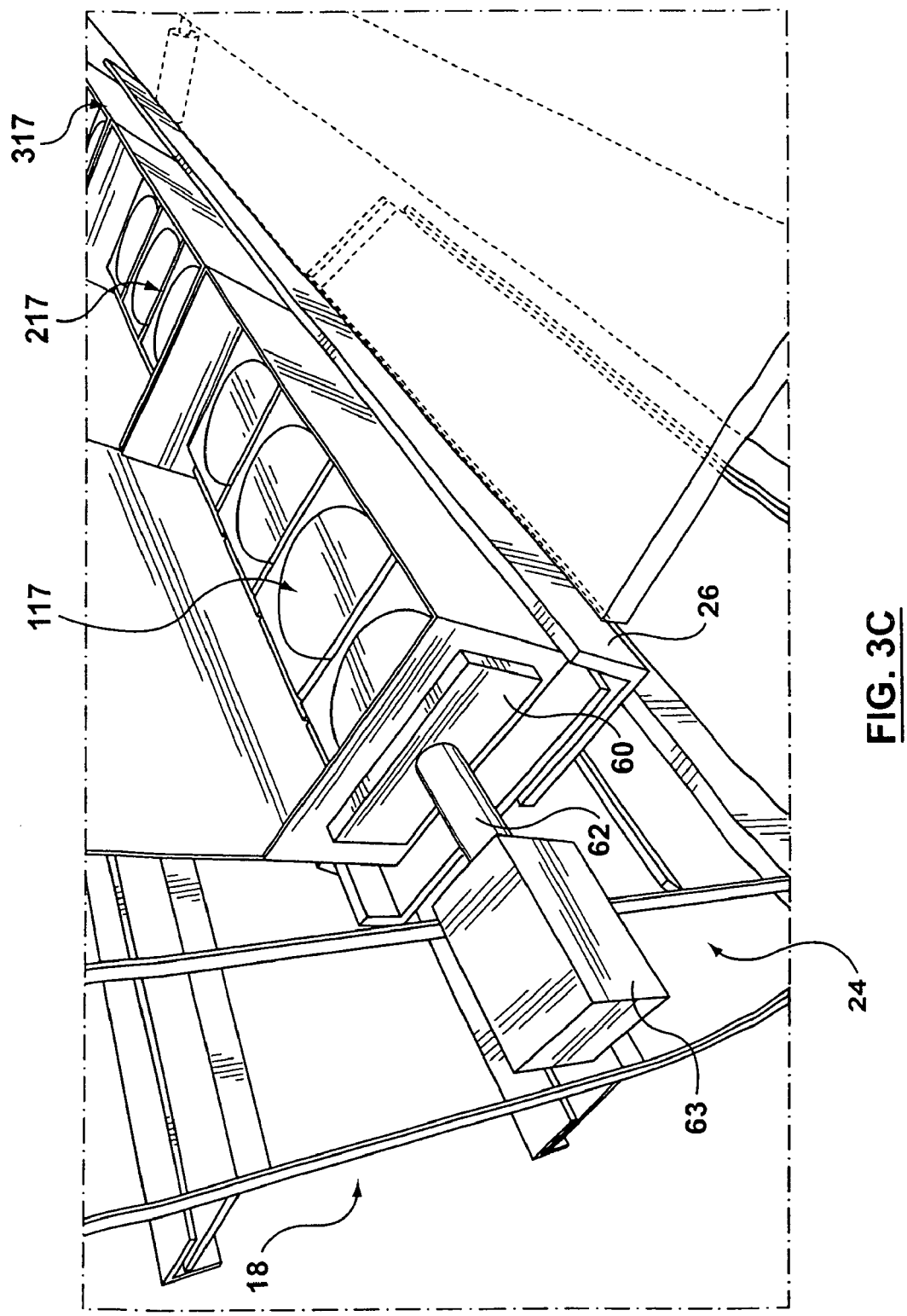
Figure 3D:
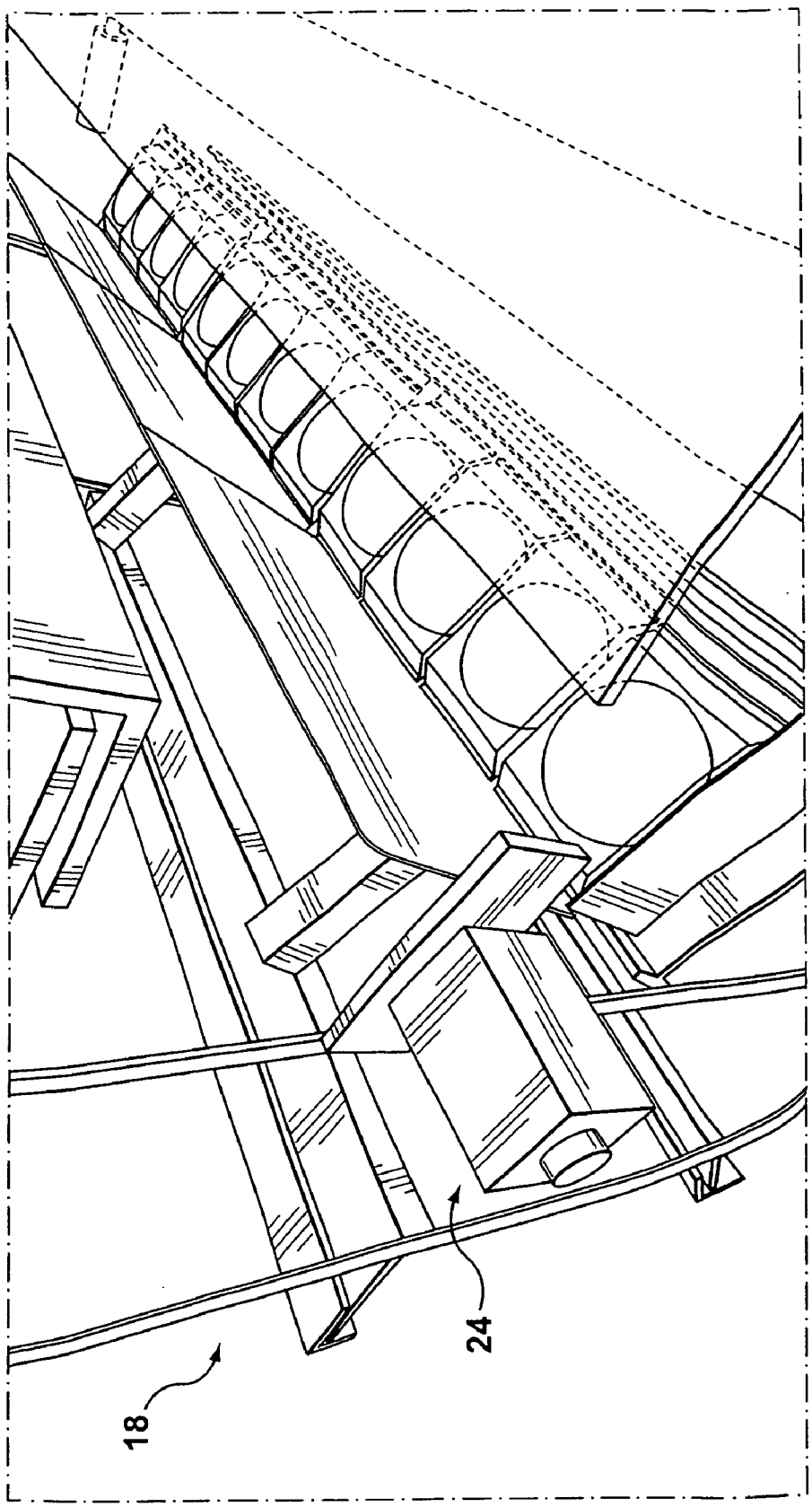

With reference to FIGS. 3A to 3D, a tray positioning apparatus 24 is mounted to a frame (not shown) and includes a plate 60 mounted to an end of a reciprocating piston 62. Piston 62 is interconnected to and can be powered by a conventional pneumatic reciprocating cylinder 63 and is operable to move in a reciprocal movement between an extended position as shown in FIG. 3C and a retracted position as shown in FIG. 3D. This reciprocating motion can be achieved in known ways such as for example, by using a double acting cylinder, which can for example, channel compressed air to two different chambers which in turn provides interchanging forward and backward acting forces on the piston. To channel the compressed air appropriately, valves can be driven between open and closed positions by solenoids responsive to signals from PLC 100 (FIG. 1A). Piston 62 has at its extension end a front plate 60 attached thereto. Plate 60 is positioned to be able to abut the trailing end face 117a of the last carton 117 in a train of three cartons 117, 217 and 317, each of which has been loaded onto a shelf 26 by tray input conveyor 16. Tray positioning apparatus 24 is positioned so that when a shelf is at a tray loading position, where items 11 are loaded into the trays, the apparatus can assist in holding the trays in a stable position. This can be accomplished by holding the trays in serial abutment with each other in a slot formed by side walls 48a, 48b, end wall 50 of shelf 26, and plate 60. The plate 60 may be configured to exert a small axial compressive force on trays 117, 217, 317 to ensure that they are stable.

Figure 5A:
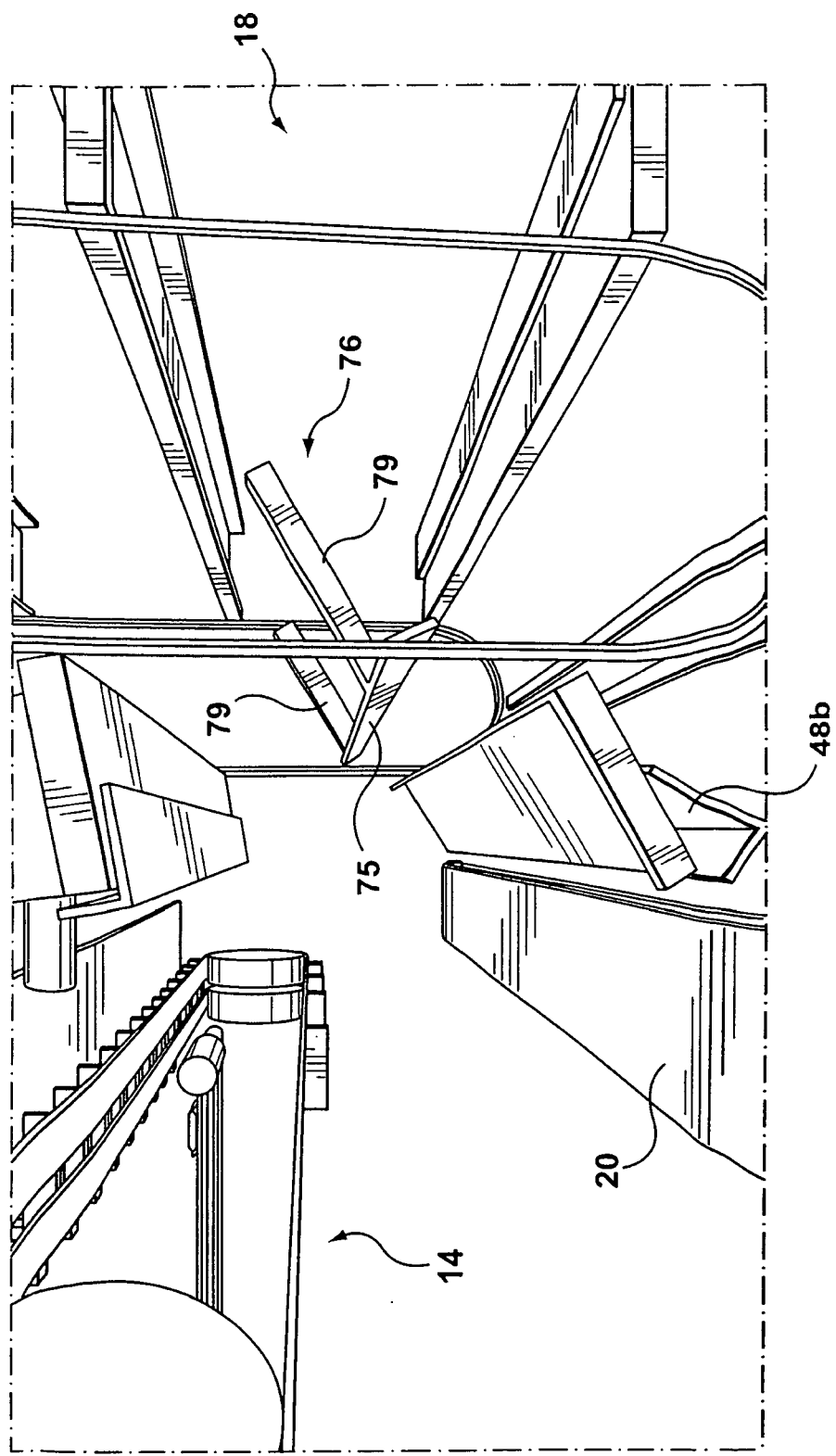
Figure 5B:
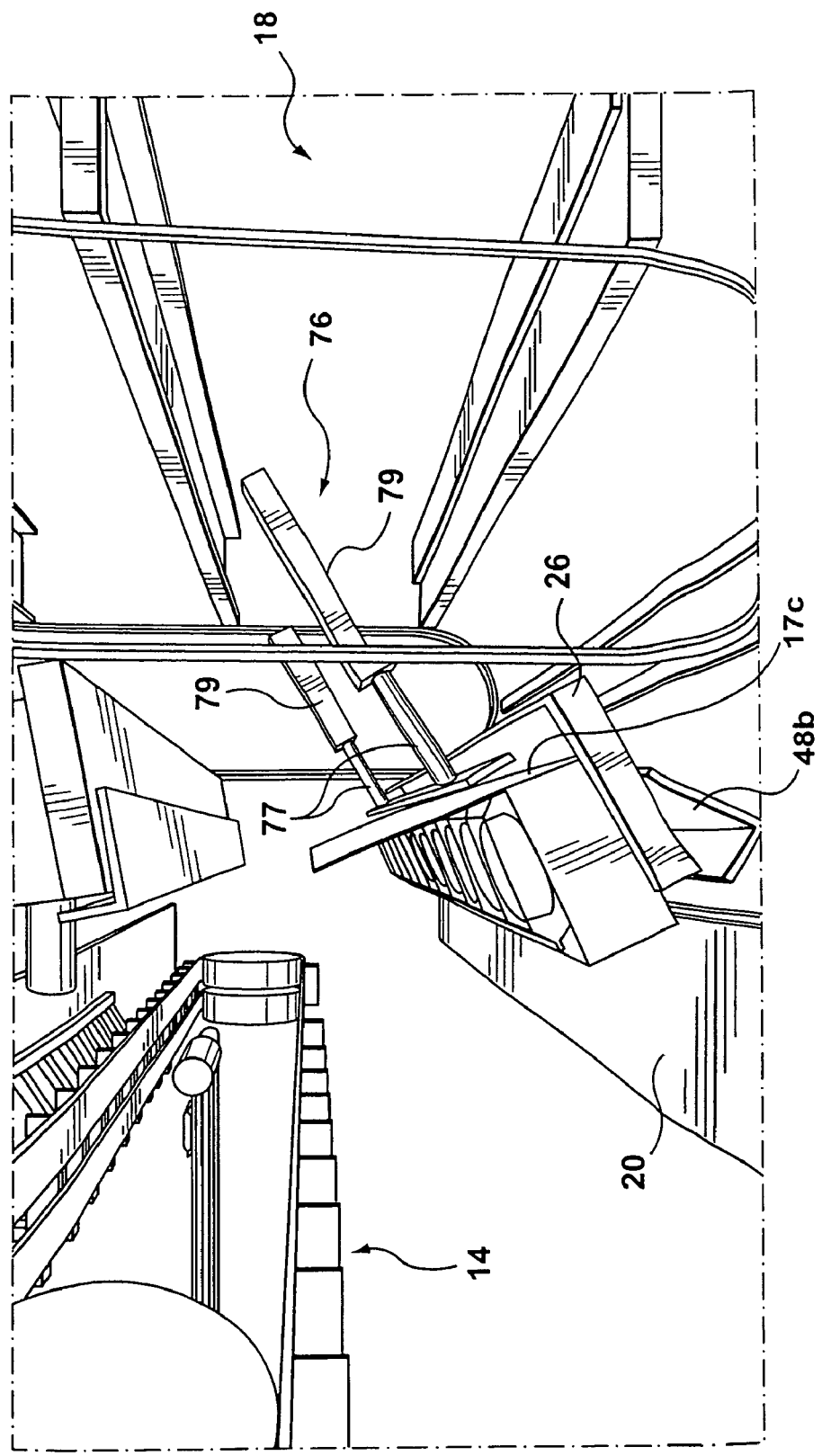

With reference to FIGS. 5A to 5C, a tray discharge apparatus 76 can include a plate 75 mounted to an end of a pair of longitudinally spaced reciprocating pistons 77. Pistons 77 can be mounted to a frame (not shown) and interconnected to and powered by a conventional pneumatic reciprocating cylinder device 79, in a manner similar to the pneumatic cylinder and piston described above. The pistons 77 are operable through activation of the pneumatic cylinder 79 to move back and forward between an extended position as shown in FIG. 5C, through a partially extended position shown in FIG. 5B, and a retracted position as shown in FIG. 5A. This movement can be controlled by valves, solenoids in communication with and controlled by PLC 100. Plate 75 is positioned to be able to abut the trailing side face 17*c* of each of the three cartons 117, 217 and 317 in the train held on a shelf 26 when the shelf is at the tray discharge position shown in FIG. 5C. At the position shown in FIG. 5C, the trays 117, 217 and 317 have been pushed off the shelf 26 transversely onto tray output conveyor 20, by which they can be transported away for further processing.

With reference again to FIG. 1A, the tray input conveyor 16 includes an endless belt 66 supported at either end by rollers 61, one or more of which can be driven by a motor 70 which may provide for continuous or intermittent movement and for a constant or varying speed. In this embodiment belt 66 is driven for continuous movement at a substantially constant speed and carries on its upper surface a plurality of trays 17, generally in serial abutment with each other.

Figure 6C:
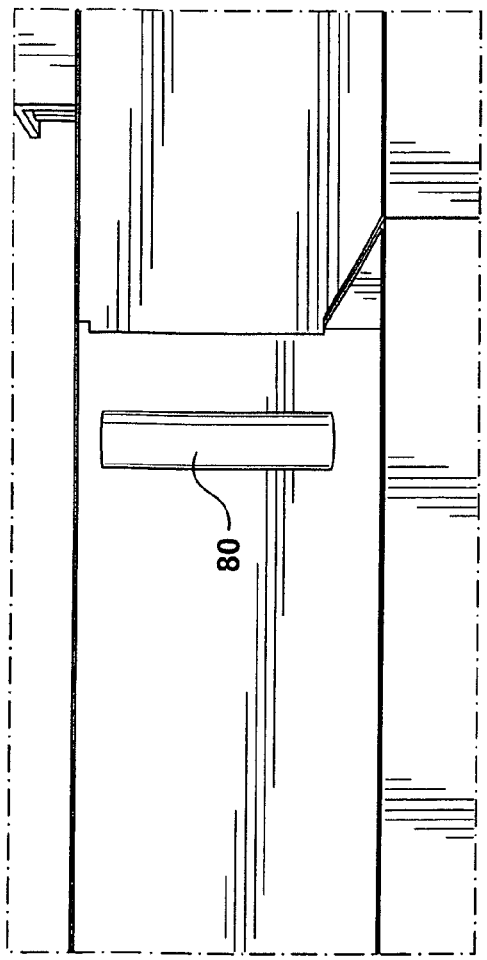
Figure 6D:
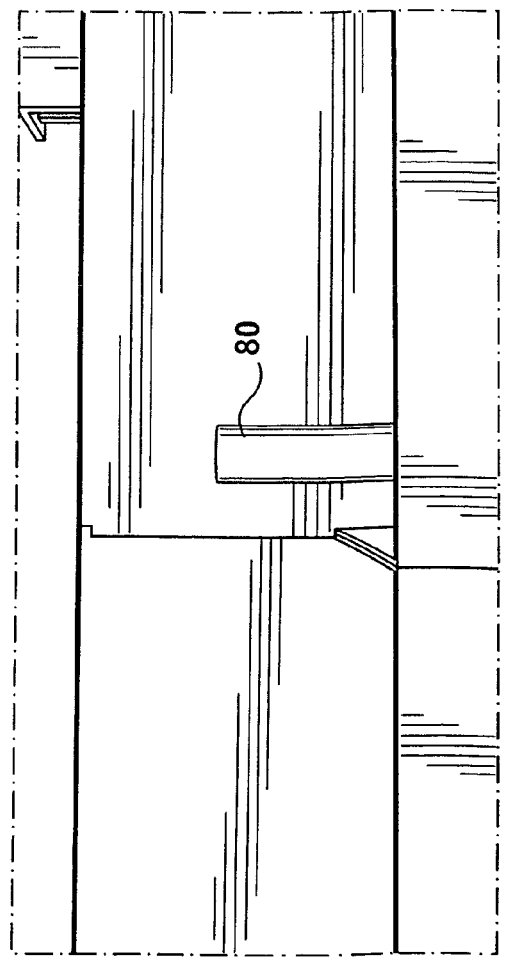
Figure 7A:
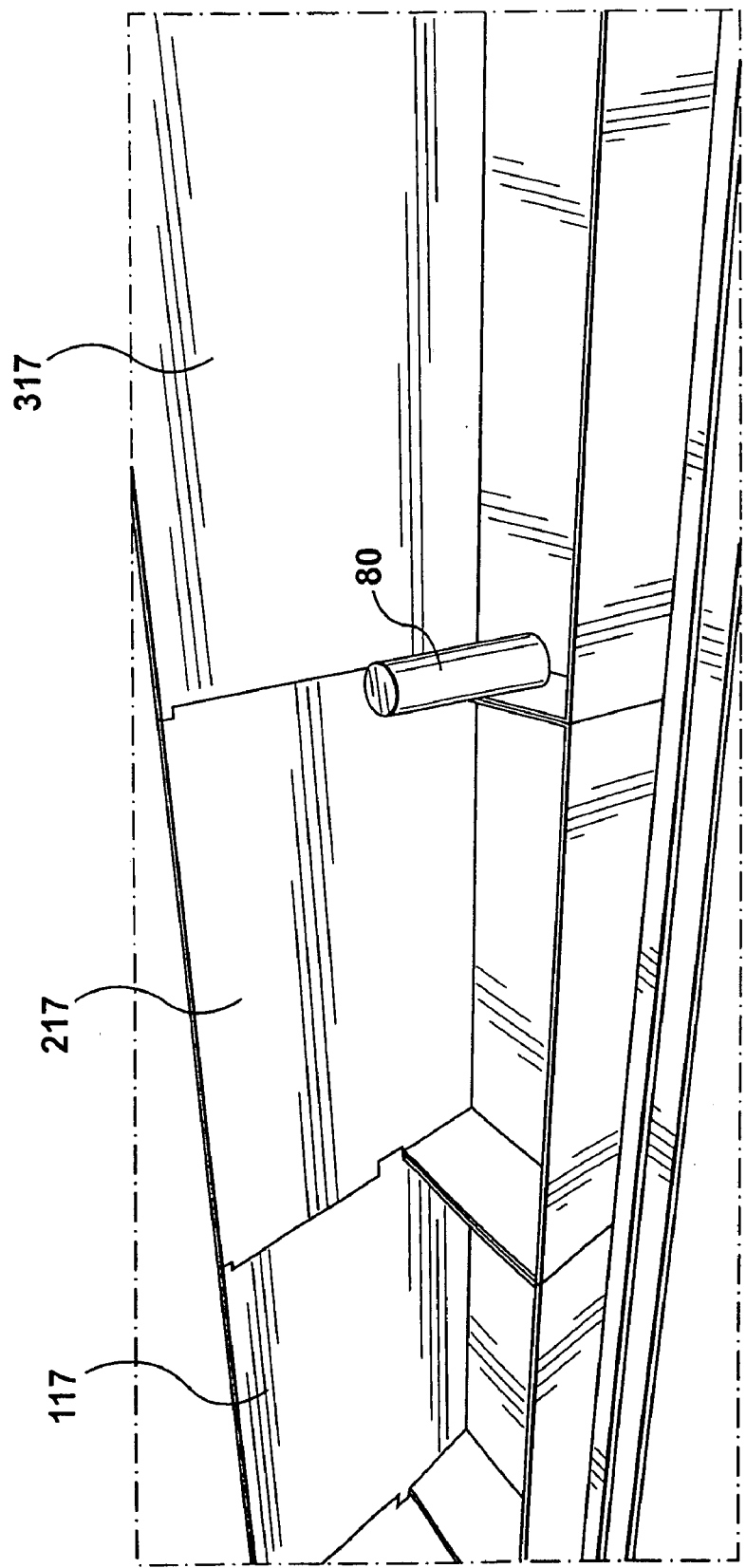
FIGS. 7A to 7D are top perspective views of the tray retaining element of FIGS. 6A to 6D, engaging trays on a tray input conveyor, in the system of FIGS. 1A to 1F.
Figure 7B:
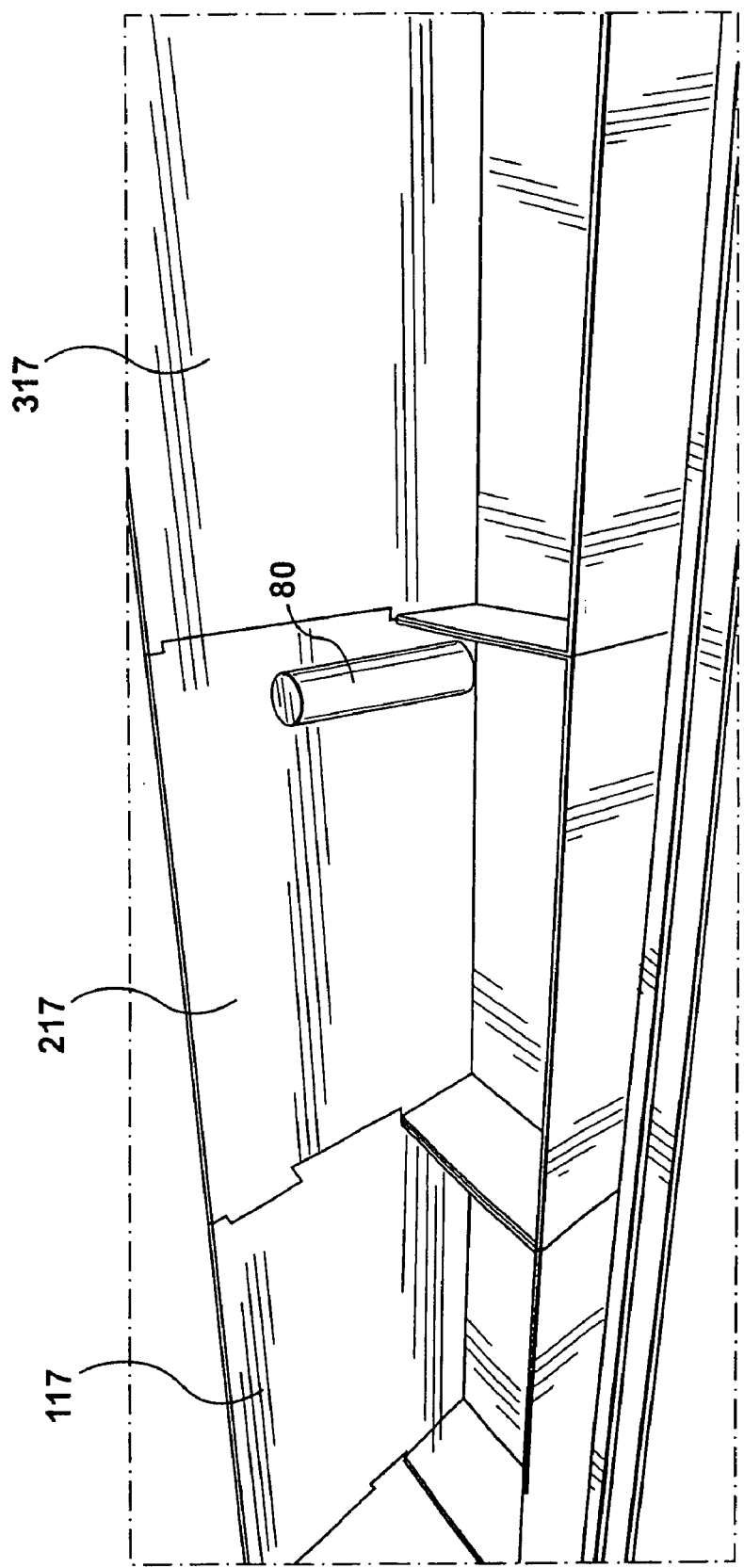
Figure 7C:
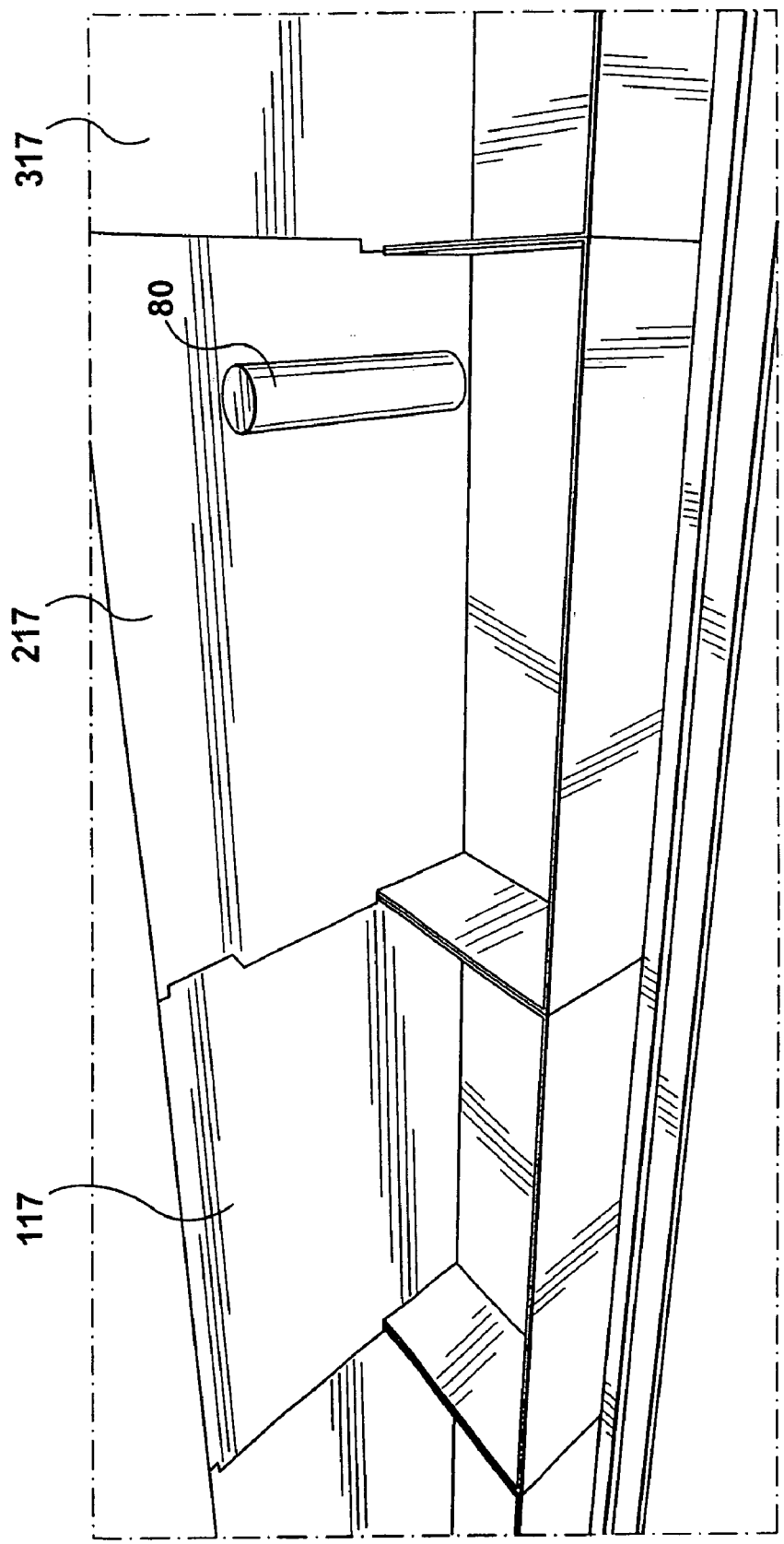
Figure 7D:
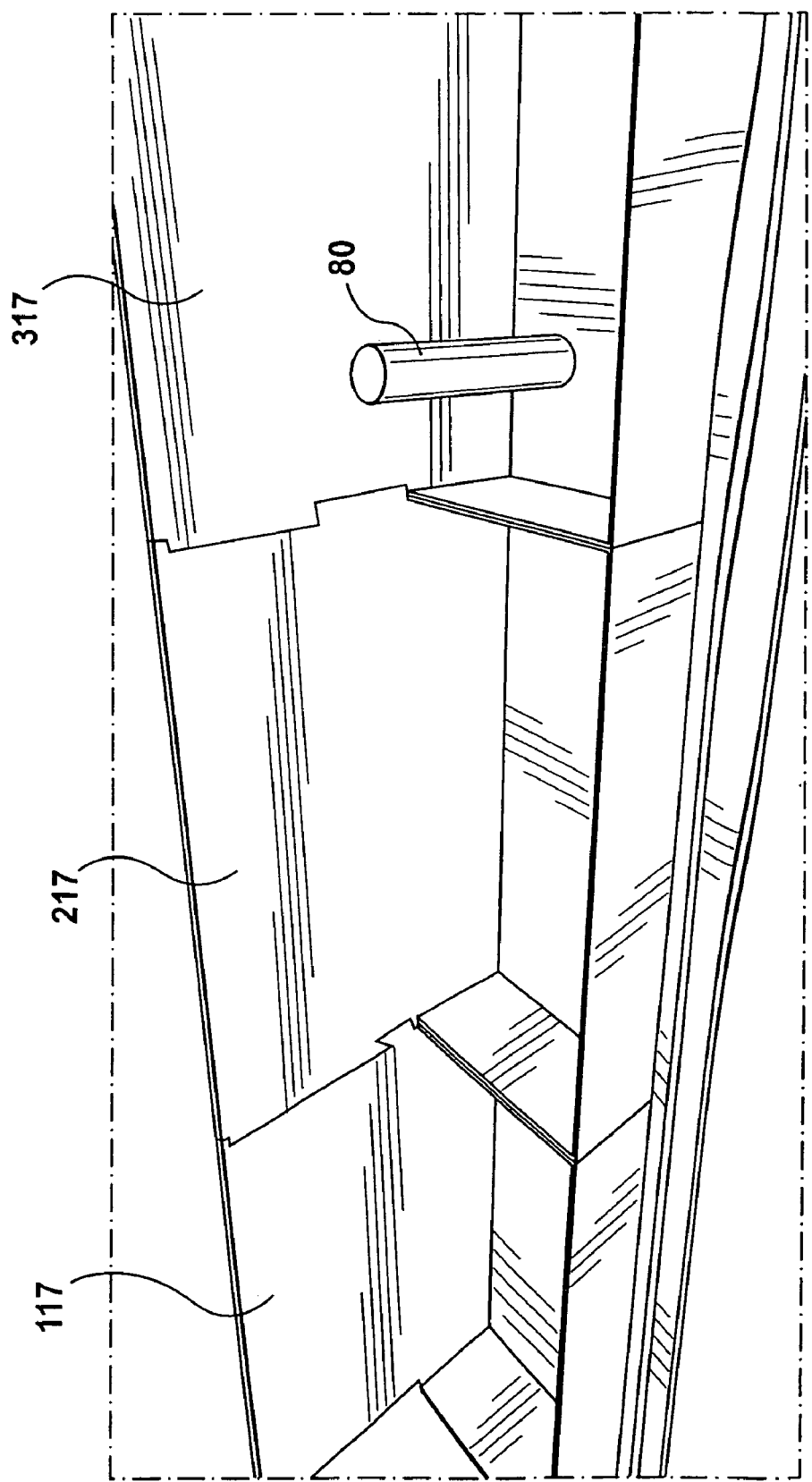

Input tray conveyor 16 delivers trays 17 toward vertical tray conveyor 18. Trays can be delivered in batches. Each batch can comprise a lead tray 317, a middle tray 217 and a trailing tray 117 (see FIG. 7A). Tray conveyor 16 will push the batch of trays 117, 217, 317 onto a shelf 26 of vertical conveyor 18. As conveyor 16 is running continuously, a tray retaining apparatus (only finger 80 of which is shown) is provided to retain each batch, until such time as a shelf 26 is ready to receive a batch of three trays. Various tray retaining apparatus can be used, and the tray retaining apparatus can for example be a walking beam conveyor and can have a tray retaining finger or member 80 depending downwardly therefrom. Such a finger 80 can be deployed on an intermittent basis to engage an interior face of trailing end wall 317*a*, of the leading tray 317 in each batch of three trays, when it is desired to restrain a batch of trays 117, 217, 317. When tray member 80 is in the position shown in FIGS. 6A and 7A, engaging the inside face of rear wall 317*a* of the leading carton 317, conveyor belt 66 will just slide underneath and against the bottom surfaces of the trays, movement of the trays toward the in-feed for vertical conveyor 18 being restricted by member 80. When it is desired to load three trays 117, 217, 317 onto a shelf 26, finger 80 is raised (FIGS. 6B and 7B), allowing three trays 117, 217, 317 to pass by. The movement of member 80 can also be controlled by PLC 100 and an electronic eye or other sensor can be used to detect when an empty shelf 26 is in position ready to receive a batch of trays. Other mechanisms can also be employed to effect the operation of the member 80 to release one batch of trays and then restrain the following batch.

The operation of tray loading system 10 will now be described. In this embodiment, items 11 are shown being fed serially and continuously in turn by item input conveyor 12, into cavities 41 that are positioned at an item receiving location of item accumulating conveyor 14. Items 11 would be positioned at an appropriate spacing on conveyor 12 for proper feeding to accumulator 14. Sequentially, first all of the cavities 41 defined by the flights of one of belts 36 and 38 are filled in turn with an item 11. This is accomplished by indexing the respective belt 36, 38 carrying the cavities currently to be filled, so that each cavity receives a single item 11. Once one cavity is filled, the belt is indexed so the next cavity in the set is positioned ready to receive and then does receive an item 11. The flow of items needs to be controlled so items 11 are fed properly to accumulating conveyor 14. The use of a sensor to detect the filling of a cavity could be used in conjunction with PLC 100 to ensure the proper movement of conveyor 12 and accumulating conveyor 14.

Once each of the cavities 41 in the set of cavities on the belt has been filled, that set of flights is moved by moving the appropriate belt 36 or 38 of accumulating conveyor 14, along the conveyor path so that the flights 40 and their respective cavities 41 are aligned with the fingers or sweep members 23 of the item discharge apparatus 22 (FIG. 1A), as well as a set of trays 117, 217, 317 held on a shelf 26 of vertical conveyor 18. It will be noted from FIGS. 2A and 2B, that the top openings of trays 117, 217, 317 are disposed slightly below the horizontally oriented top side runs of belts 36 and 38 and the upper surface of platform 15, so that when item discharge apparatus performs its sweeping action it will transfer the items in each of the cavities between flights 40 across platform 15 into transversely positioned trays.

FIGS. 1A to 1F show the sequential movement of belts 36 and 38. In FIG. 1A, belt 36 is being indexed to complete the filling of the cavities of its set of flights. Belt 38 has already previously discharged the items 11 held in its flights into an earlier delivered batch of trays and is holding at, or moving to, a waiting position upstream of the item input position from item input conveyor 12. At this waiting position, flights 40 of belt 38 do not interfere with the completion of the filling of the flights 40 of belt 36.

FIG. 1B shows flights from belt 36 having been previously filled with items 11 and moved to the tray loading position, are in the process of being discharged from the cavities 41 of item accumulating conveyor 14 by item discharge apparatus 22. At the same time, the flights 40 associated with belt 38 are starting to have their cavities 41 filled with items 11 from accumulating conveyor 12.

Figure 1C:
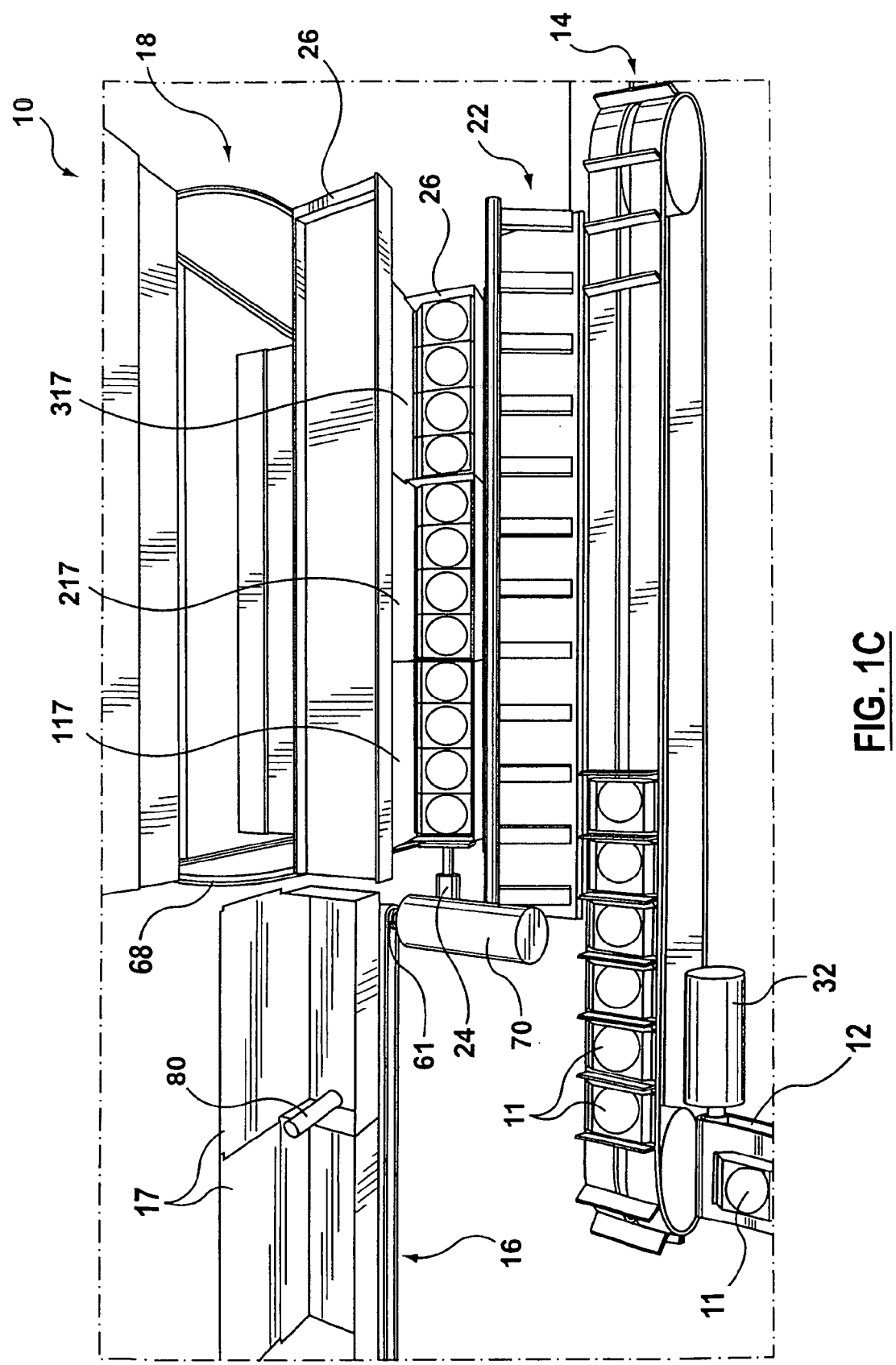

In FIG. 1C, the discharge of items 11 from the flights of belt 36 has been completed and the items have filled one layer of trays 117, 217 and 317. At the same time, the process of filling the set of cavities 41 of belt 38 is continuing.

Figure 1D:
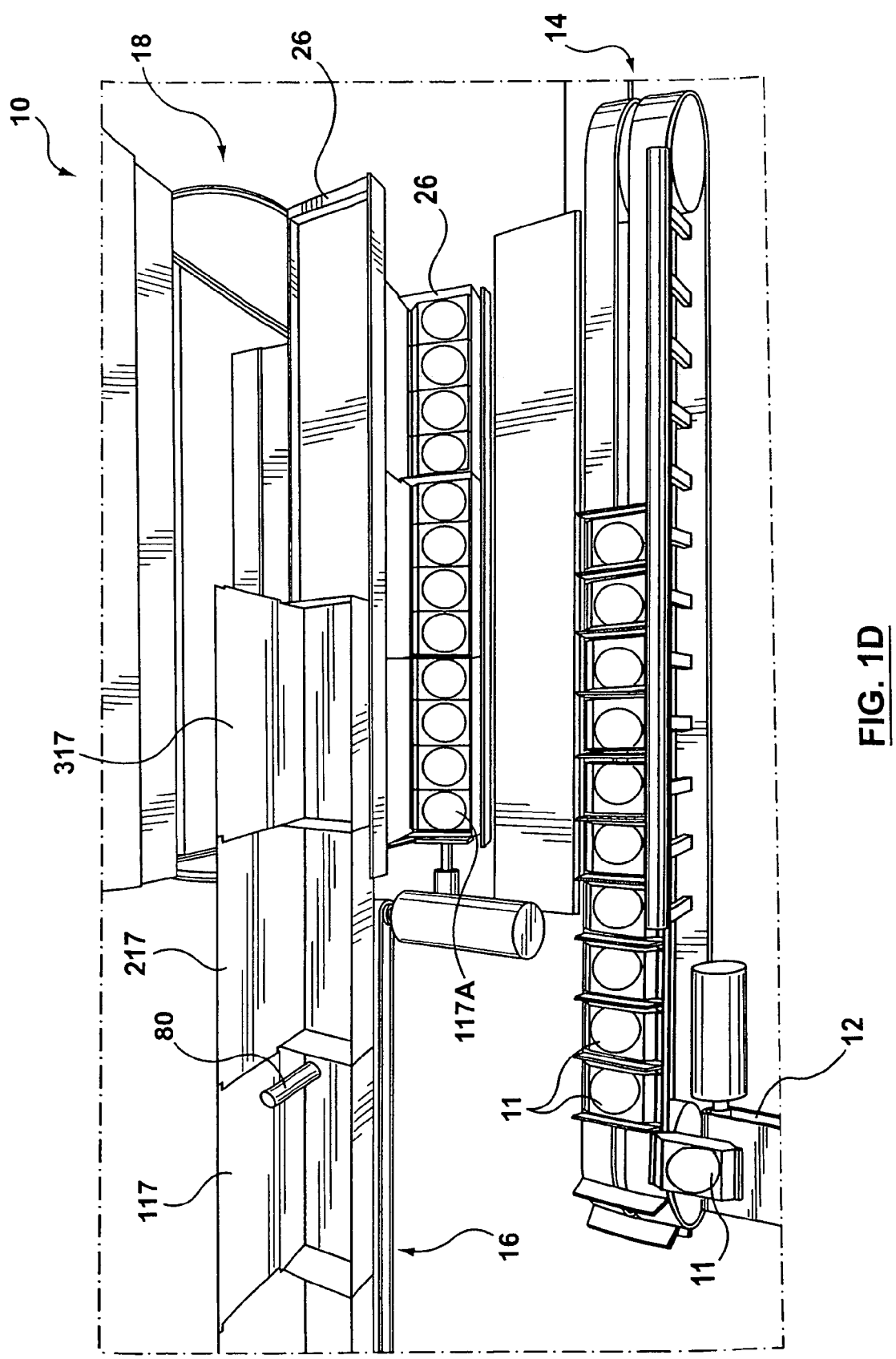

In FIG. 1D it is shown that the filling with items 11 of cavities 41 of belt 38 is close to being completed. Additionally, restraining member 80 has moved upwards to release another batch of trays 117, 217 and 317 so that they move onto a vertically aligned second shelf (above the first shelf positioned vertically below and carrying the first batch of trays 117, 217, 317 that are currently being filled).

Figure 1E:
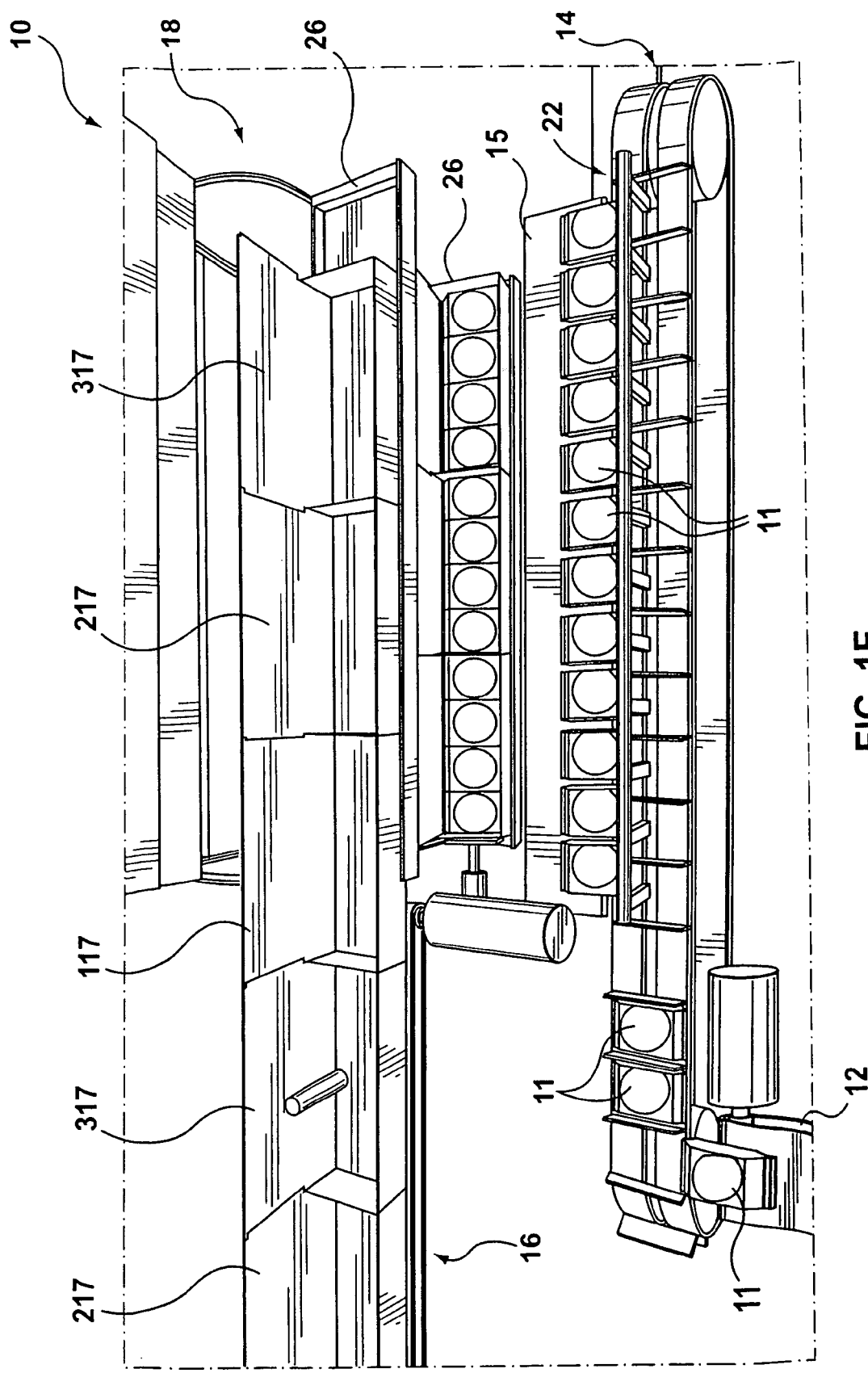

In FIG. 1E, item discharge apparatus 22 is in the process of discharging items 11 from the cavities 41 of belt 38 across platform 15 and over the edge of platform 15, to fall into trays 17 so that a second layer of items 11 can be provided on top of the first layer of items, in each of the trays 117, 217, 317. As the drop from platform 15 is typically relatively small, there will not be an opportunity for items 11 to become disoriented when they land in the trays. Furthermore, it is usually not critical that the items 11 be perfectly positioned in the tray, although they should be lying substantially flat. Additionally, the flights 40 of belt 36 have now already started to be moved past the item in-feed position such that two items 11 have already been fed from conveyor 13 into two of its cavities 41. Additionally, in the second batch of trays 117, 217, 317 being fed from tray input conveyor 16 onto a shelf 26 of vertical conveyor 18, all three trays have almost been pushed onto the shelf 26 positioned adjacent conveyor 16.

Figure 1F:
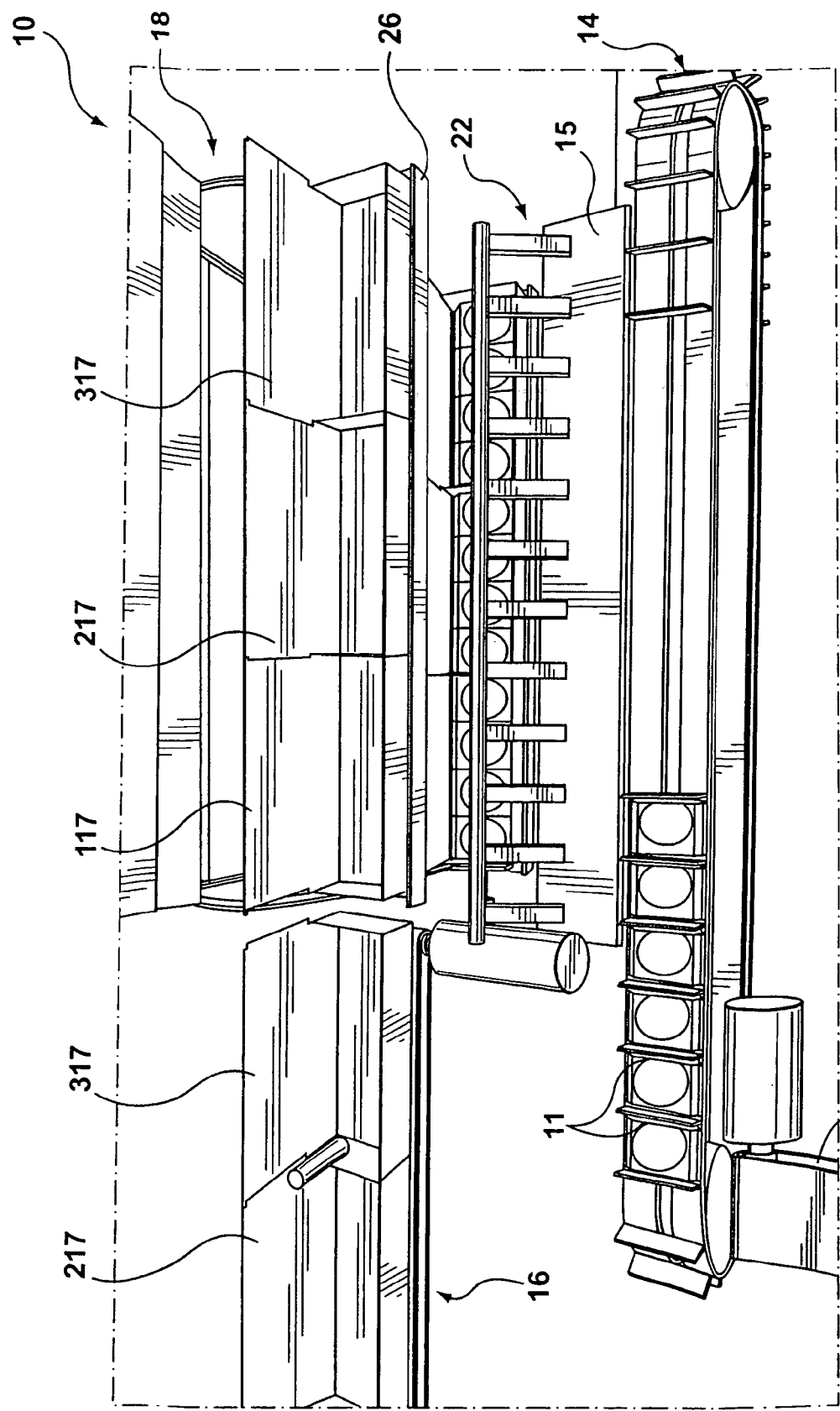

In FIG. 1F, the loading of items 11 into the trays by item discharge apparatus 22 has been completed, as the items 11 held in cavities 41 of belt 38 have been pushed across platform 15 into trays 117, 217, 317. The result is the loading of two layers of items 11 into the batch of trays 117, 217, 317. Discharge apparatus 22 has commenced its return movement, with fingers 23 being raised to ensure that in the return movement, they do not contact the items held in the cavities of belt 36, some of which are still in the process of being filled. Additionally, the next batch of trays has now been fully loaded onto the shelf 26 adjacent tray input conveyor 16, and restraining member 80 has been lowered and moved backwards to form a gap between the trailing tray 117 of the just loaded batch of trays, and the leading tray 317 of the next to be loaded batch of trays. The gap relieves any pressure which would otherwise be applied to the trailing wall 117a of tray 117 by the leading wall of leading tray 317 of the to be loaded batch of trays. Thus, member 80 will restrain the next to be loaded batch of trays, while the vertical conveyor moves the just loaded batch of trays downwardly to the item loading position, and the risk of tray 117 being upended from any such pressure is reduced or eliminated.

After the operations shown in FIG. 1F, the movement of vertical conveyor 18 will commence to move the just filled batch of trays away from the item loading position, and moves the just loaded batch of trays to the item loading position.

The system will have then completed one cycle and will move again to the positions shown in FIG. 1A.

Figure 2B:
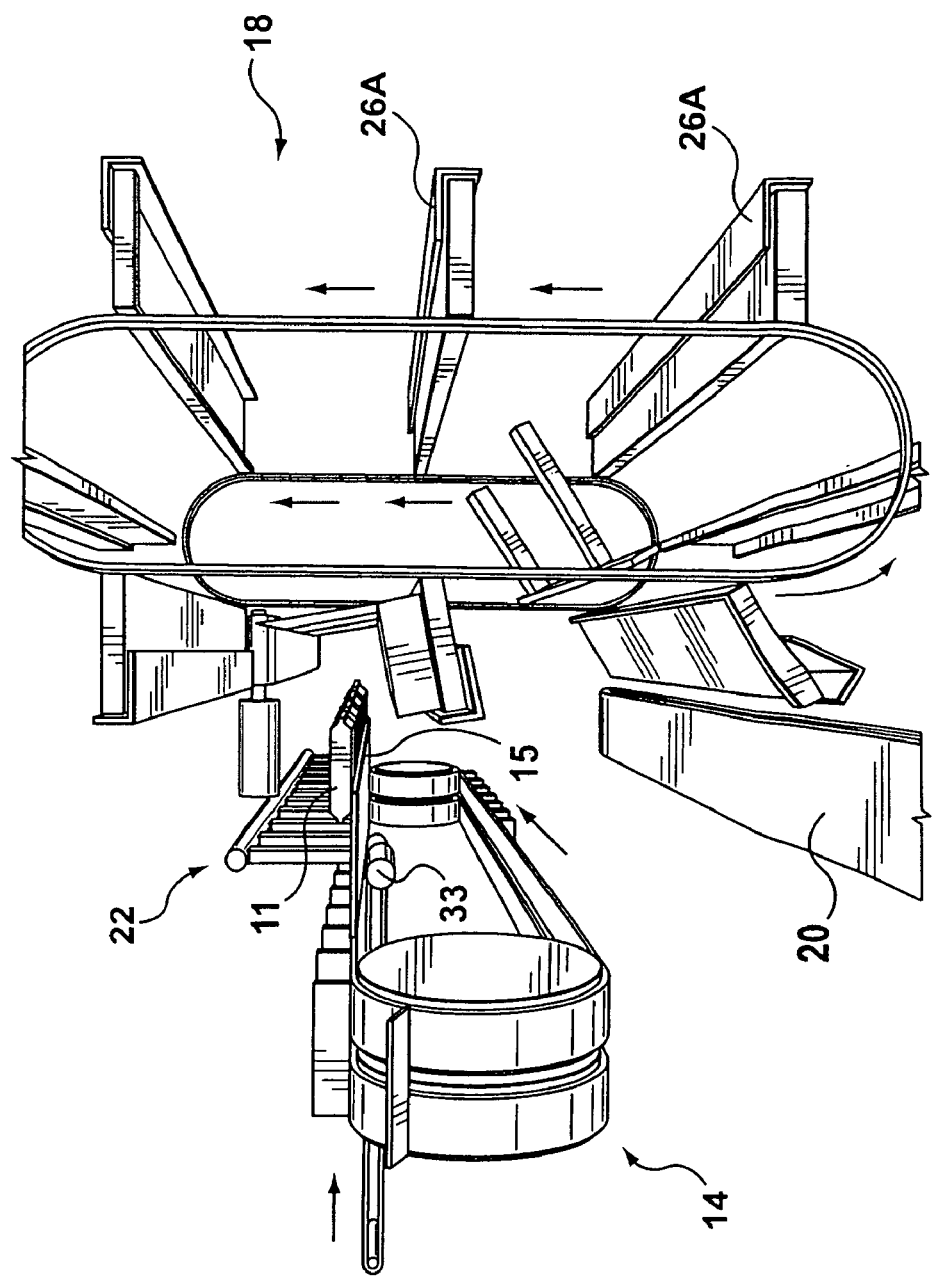
Figure 2C:
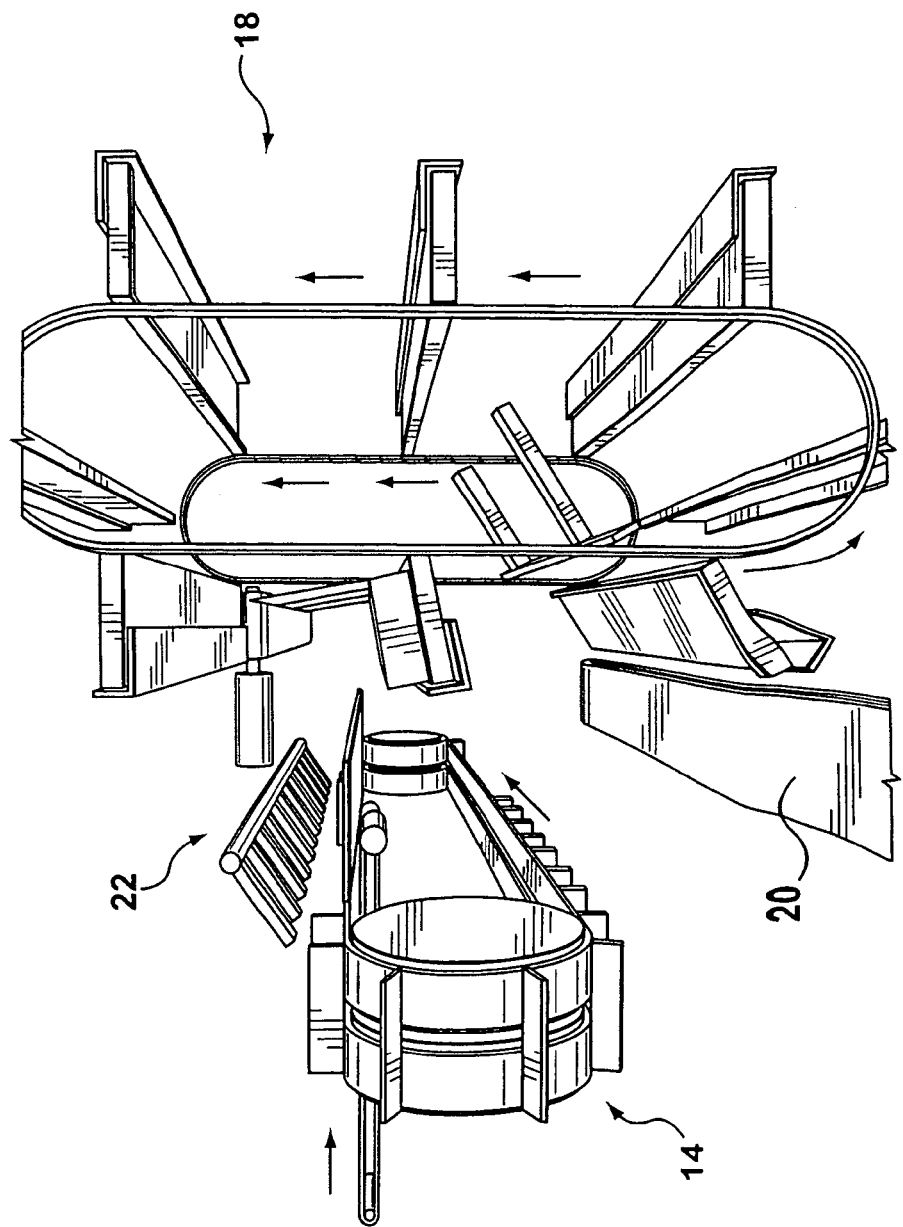
Figure 2D:
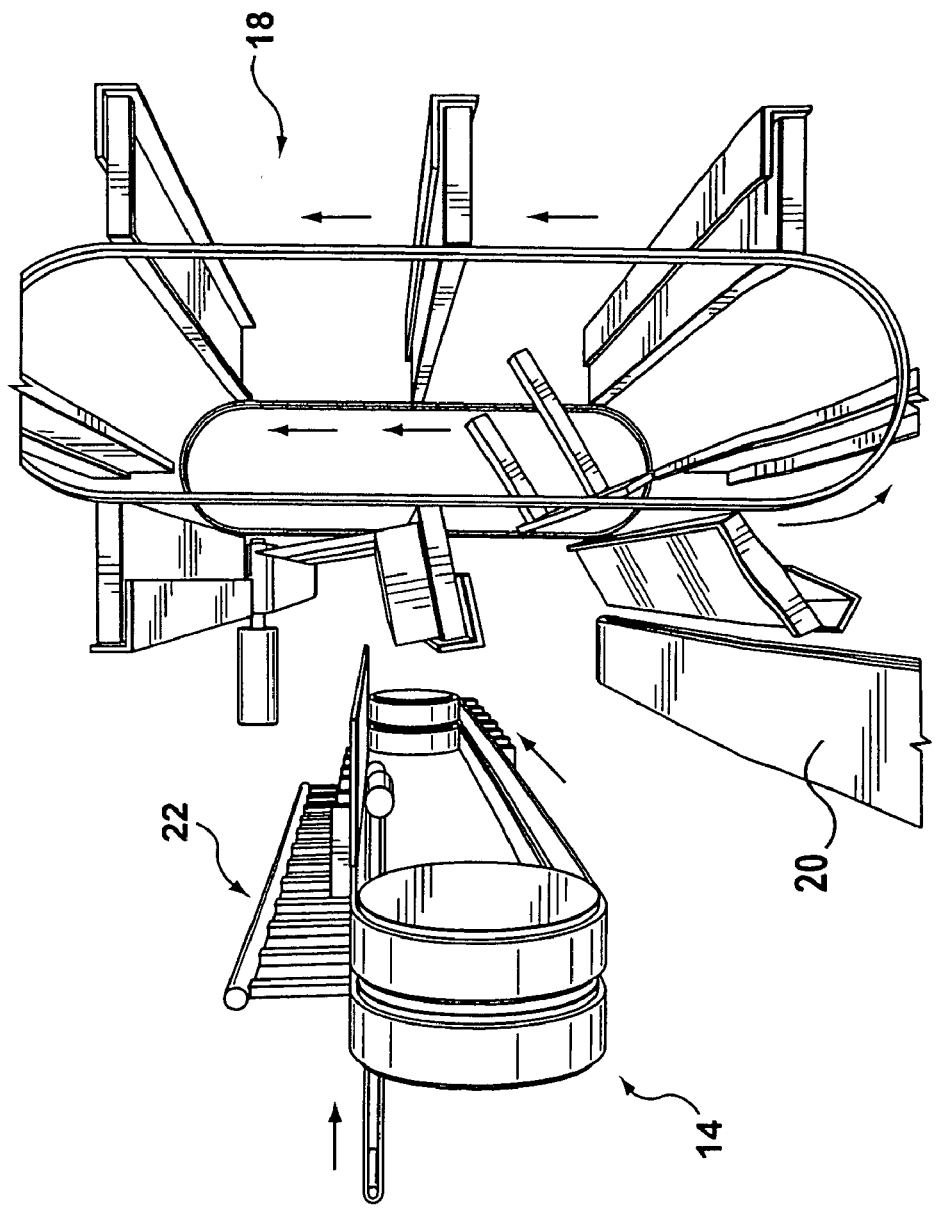
Figure 2E:
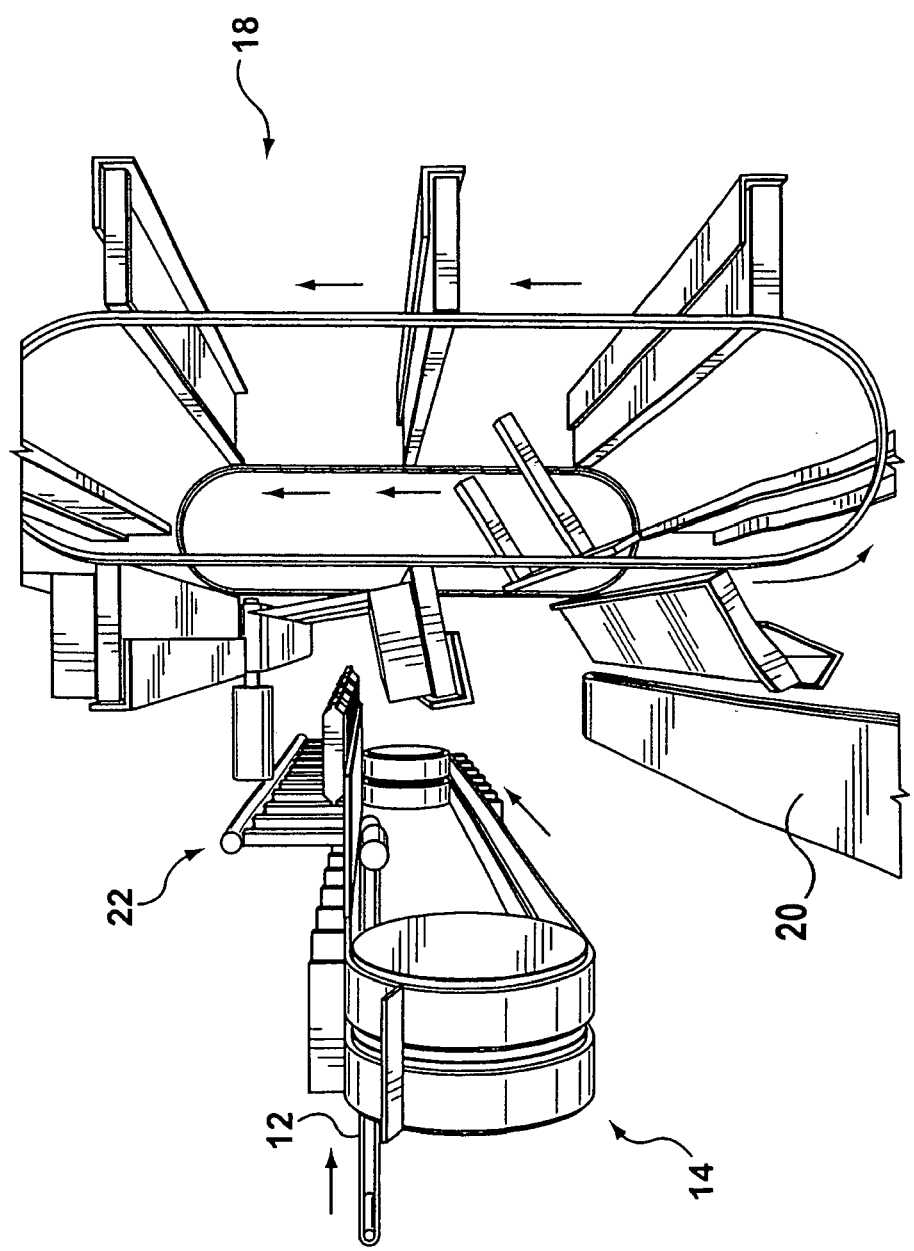
Figure 2F:
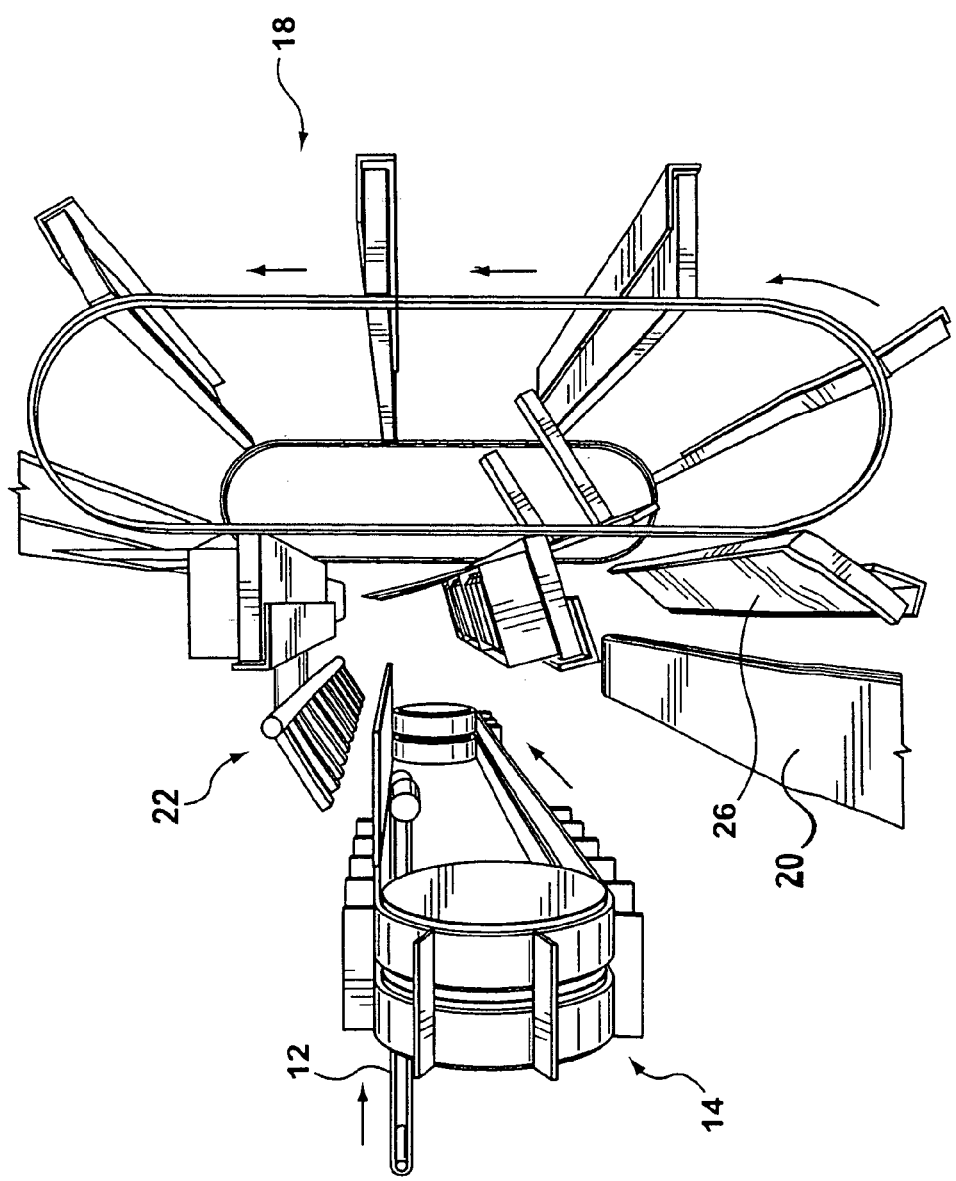
Figure 2H:
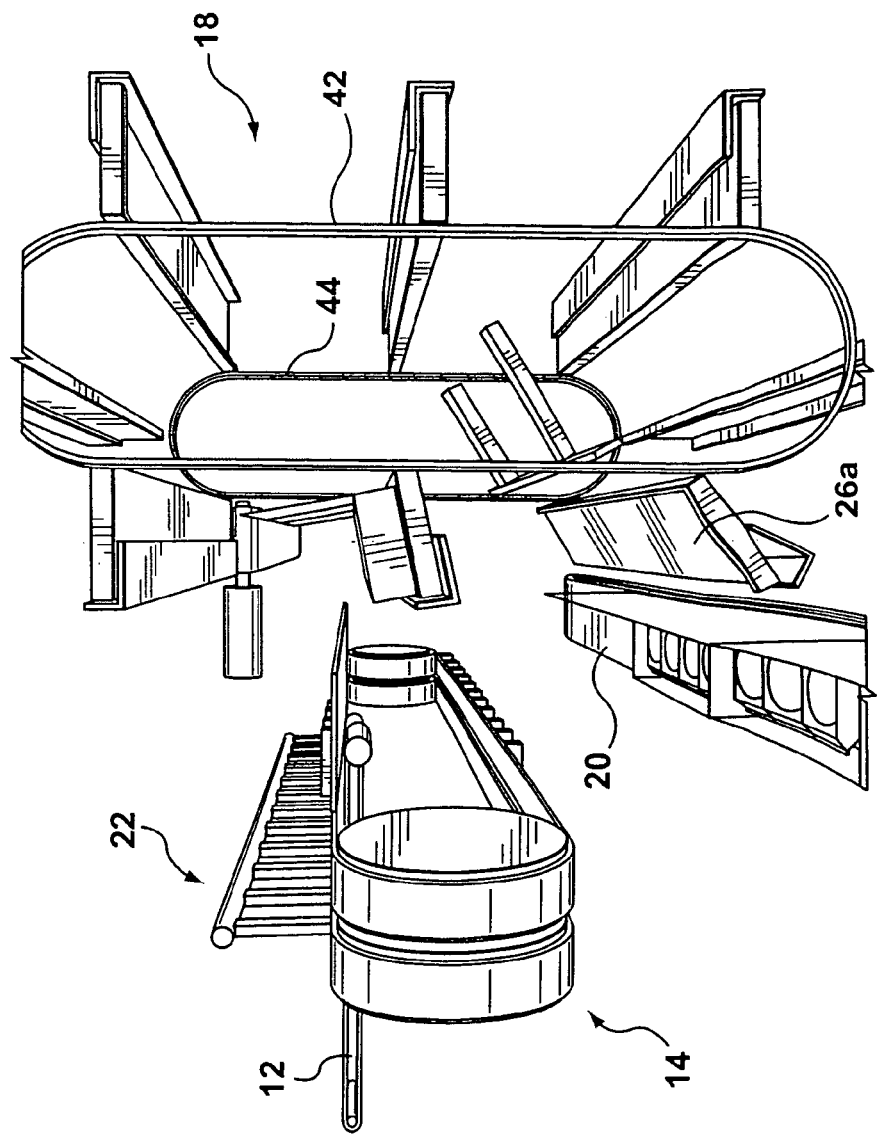

Referring now to FIGS. 2A to 2H, the process of transfer from item accumulating conveyor 14 to vertical conveyor 18 is shown in further detail. In FIG. 2A, item discharge apparatus 22 is shown commencing a sweep of items 11 from item accumulating conveyor 14 across platform 15 into trays 17. This position shown in FIG. 2A corresponds with the position of discharge apparatus 22 shown in FIG. 1A. As shown in FIG. 2A, a shelf 26 with trays 17 is positioned with its top edge slightly below the upper run of belts 36 and 38 and the upper surface of platform 15. The front edge of the trays is positioned a short horizontal and vertical displacement from the adjacent edge of platform 15. Thus, as shown in FIG. 2B, as item discharge apparatus 22 has almost completed its sweep (corresponding with the position of discharge apparatus 22 shown in FIG. 1B), items 11 move across platform 15 and will fall into trays 17 which can be held in a substantially stationary position by vertical conveyor 18. The precise positioning of the tray relative to the edge of platform 15 can be selected to ensure that items 11 will usually, if not always, fall into the batch of trays 117, 217, 317 in their proper configuration. The proper positioning of items as they are loaded into trays 117, 217, 317 is assisted by the slight downward sloping of shelf 26 at the item loading position (which can be sloped downward at for example between about 1 and 10 degrees and preferably about 5 degrees). This sloping of the shelf can be effected by the path of the chains of the conveyor 18 and mounting of shelves thereon.

FIGS. 2C, 2D, 2E and 2F show the sequential movement of item discharge apparatus 22 sweeping a second layer of items 11 into trays 17. As shown in FIG. 2C, fingers 23 have been pivoted rearwardly about their longitudinal axis of rod 21, during the return transverse movement. In FIG. 2D, fingers 23 have been rotated back to a substantially vertical orientation, and are about to commence a sweeping action to sweep the second layer of items 11 into trays 117, 217, 317. In FIG. 2E, the fingers 23 have pushed the second layer of items 11 to the edge of platform 15 and those items are about to fall into trays 117, 217, 317.

In FIG. 2F, the fingers 23 have been rotated by rod 21 in preparation from the return transverse movement to the other side of belts 36, 38. In FIG. 2G, the fingers 23 are returning to the transverse position where they will be ready for the next sweeping action, and in FIG. 2H they are ready to sweep a first layer of items 11 into the next batch of trays which have been lowered into the tray loading position by vertical conveyor 18. The loading cycle has thus substantially returned to the configuration shown in FIG. 2A.

It should be noted that it may be possible to configure the overall system 10 so that the next batch of trays 117, 217, 317 to be loaded can be placed onto the next shelf 26 during the loading of the first layer of items 11 in the current batch of trays. Optionally, if the loading of the next shelf with trays from conveyor 16 is completed, a small vertical adjustment by conveyor 18 may possibly be of assistance in some applications or embodiments, so that the position of the current batch of trays being loaded can possibly be moved up, or more likely down, a small amount, to help ensure that the first layer of items is loaded properly and the second layer of items will be loaded properly, with a reduced risk of improper placement into the trays on top of the first layer of trays.

In the movement as shown in FIGS. 2E and 2F, item discharge apparatus 22 is in its return movement back to the ready position and the vertical tray delivery conveyor 18 has commenced the movement of the shelf carrying the loaded trays (as well as all the other shelves which are attached to vertical conveyor 18) downwards and in an anti-clockwise direction towards tray output conveyor 20.

With reference to that of FIG. 2G, the shelf 26 carrying the loaded trays reaches a tray discharge position, shown in FIG. 2G. At this position, the shelf base 46 can be oriented more steeply downward from the horizontal, such as for example about 15 degrees. Also with reference to FIG. 5C, at this position, the L-bracket sidewall 48b has been pivoted about a longitudinal axis on pins 83 such that the sidewall 48b has been retracted. Tray pushing apparatus 76 has been operated so that longitudinal oriented plate 75 is translated transversely downward to push the trays from shelf 26 onto tray output conveyor 20 (see also FIG. 5B). Pistons 77 are then retracted as shown in FIG. 2H, which will then allow vertical conveyor 18 to operate to move the just unloaded shelf 26 away from the tray unloading position. It should be noted that the positioning of shelves is such that as one shelf 26 is discharging its trays onto conveyor 20, another shelf 26 is positioned to start receiving items from item accumulating conveyor 14.

With reference now to FIGS. 3A to 3D, tray positioning apparatus 24 is shown in operation. Prior to a shelf 26 and its trays being held thereon starting to receive items 11 from item accumulating conveyor 14, the piston 62 of tray positioning apparatus 24 is actuated such that plate 60 abuts the trailing wall 117a of the trailing tray 117 and pushes into tray 117, 217 and 317 into abutment with each other up against end wall 50 of shelf 26. Plate 60 remains in abutment with the end wall 117a of tray 117 during the loading process. After the second layer of items has been loaded from item accumulating conveyor 14, piston 62 is retracted to release the tray 117 which permits vertical conveyor 18 to rotate in an anti-clockwise direction to move the shelf 26 and trays 117, 217 and 317 contained therein to the tray output conveyor 20.

With reference to FIGS. 4A, 4B, 4C, and 4D, the detailed movement of the L-bracket member that forms side wall 48b of shelf 26 is shown in detail. The detailed view in FIG. 4A corresponds substantially with the view of the shelf having trays with items, as shown in FIG. 2F. The position of wall 48b and shelf 26 shown in FIGS. 4B and 4C corresponds with the position of the system shown in FIG. 2H. It will be observed from FIG. 4D, that as the shelves reach the tray unloading position, the relative movement of the cam follower in track 85 has produced the rotation of wall 48*b*. This causes wall 48*b* to be lowered releasing the trays from the shelf 26, and they can then be pushed transversely onto conveyor 20.

It is understood that the term "tray" as used herein describes any container or holder with some kind of retaining wall(s) and an open top, such as an open-topped box. Although the invention has been described employing various specific components such as item supply conveyor 12, tray supply conveyor 16, item accumulating conveyor 14 and vertical conveyor 18, other types of apparatus can be employed to achieve the same movements. For example, instead of vertical conveyor 18, other devices capable of moving trays vertically between the different stations can be employed.

The foregoing described only preferred embodiments, and modifications and variations will readily become apparent to those of ordinary skill in the art without departing from the scope of the invention as defined by the claims hereinafter.

We claim:

1. A method of loading a tray with at least one layer of items, said tray having a base oriented generally horizontally with at least one upstanding wall and a top opening for vertically receiving a plurality of items, said method comprising:
   a) forming a plurality of items into a first group of items;
   b) moving said first group in a first generally longitudinal horizontal direction;
   c) moving the first group in a first generally transverse horizontal direction to drop the first group of items in a generally vertically downward direction directly onto the generally horizontally oriented base of said tray such that the first group is loaded into said tray through the top opening of said tray and is supported on said base; and
   d) moving the tray loaded with the first group of items in a generally vertical direction.

2. A method as claimed in claim 1 wherein said plurality of items in said first group are arranged generally horizontally to form a horizontally oriented layer of items.

3. A method as claimed in claim 2 further comprising prior to (a):
   e) delivering a plurality of items generally horizontally in series.

4. A method as claimed in claim 2 further comprising after (d):
   f) moving the tray loaded with said first group of items in a second generally longitudinal horizontal direction.

5. A method as claimed in claim 1 further comprising:
   i) prior to (d), forming a plurality of items into a second group; then
   ii) moving said second group in said first generally longitudinal horizontal direction; and
   iii) after (c) moving the second group in said first transverse horizontal direction into said tray such that said second group is position generally above said first group; and
wherein (d) comprises moving the tray loaded with the first and second group of items in said vertical direction.

6. A method as claimed in claim 5 wherein said plurality of items in said first and second groups are arranged generally horizontally to form first and second layers of items.

7. A method as claimed in claim 6 further comprising prior to (a):

e) delivering a plurality of items generally horizontally in series such that said first group can be formed and then said second group can be formed.

8. A method as claimed in claim 5 further comprising after (d):
   e) moving the tray loaded with said first and second groups of items in a second generally longitudinal horizontal direction.

9. A method as claimed in claim 8 further comprising prior to (e) and after (d) moving said tray generally transversely.

10. A method as claimed in claim 1 wherein (d) comprises moving the tray loaded with the first group of items in a generally vertically downward direction.

11. A method of loading first, second and third trays each with at least one layer of items, each of said first, second and third trays being generally longitudinally aligned in series, each said tray having a base oriented generally horizontally with at least one upstanding wall and a top opening for vertically receiving a plurality of items, said method comprising:
   a) accumulating a plurality of items into a first group; then
   b) moving said first group in a first generally longitudinal direction; then
   c) moving the first group in a first generally transverse direction to drop said first group of items in a vertically downward direction directly onto the generally horizontally oriented bases of the trays through the openings of said trays such that said first group of items is loaded through each said top opening into each of said first, second and third trays and each of said bases supports a plurality of items that had comprised the first group of items; and then
   d) moving the first, second, and third trays, each loaded with said plurality of items that had comprised the first group of items in a generally vertical direction.

12. A method as claimed in claim 11 wherein said plurality of items in said first group are arranged generally horizontally to form a horizontally oriented layer of items.

13. A method as claimed in claim 12 wherein (d) comprises moving the first, second and third trays loaded with the first group of items in a generally vertically downward direction.

14. A method as claimed in claim 12 further comprising prior to (a):
   e) delivering a plurality of items in series to an accumulating station.

15. A method as claimed in claim 12 further comprising after (d):
   f) moving the first, second and third trays, each loaded with a plurality of items in a second generally longitudinal direction.

16. A method as claimed in claim 11 further comprising after (d):
   f) moving the first, second and third trays each loaded with a plurality of items of said first group of items in a generally longitudinal direction.

17. A method as claimed in claim 11 further comprising:
   e) prior to (d), accumulating a plurality of items into a second group; then
   f) moving said second group in said first generally longitudinal direction; and
   g) after (c) moving the second group of items in said first transverse horizontal direction such that a plurality of items of said second group are loaded into each of said first, second and third trays such that said plurality of items of said second group are positioned generally above said plurality of items of said first group in each of said first, second and third trays;
and wherein (d) comprises moving the first, second and third trays each loaded a plurality of items that had comprised the first and second group of items, in said generally vertical direction.

18. A method as claimed in claim 17 wherein said plurality of items in each of said first and second groups are arranged generally to form first and second layers of items.

19. A method as claimed in claim 17 further comprising prior to (a):
  h) delivering a plurality of items generally in series such that said first group can be accumulated and then said second group can be accumulated.

20. A method as claimed in claim 17 further comprising after (d):
  i) moving the tray loaded with said plurality of items of said first and second groups of items in a second generally longitudinal horizontal direction.

21. A method of loading first and second trays each with at least one layer of items, each of said first and second trays being generally longitudinally aligned in series each said tray having a base oriented generally horizontally with at least one upstanding wall and a top opening for vertically receiving a plurality of items, said method comprising:
  a) forming a plurality items into a first group; then
  b) moving said first group in a first generally longitudinal horizontal direction; then
  c) moving the first group in a first generally transverse horizontal direction to drop the first group in a generally vertically downward direction directly onto the generally horizontally oriented bases of said first and second trays such that a plurality of items of said first group are loaded through said top opening into each of said first and second trays and are supported on their respective bases; and then
  d) moving the first and second trays, each loaded with a plurality of items that had comprised the first group of items in a generally vertical direction.

22. A method of loading a tray with at least one layer of items said tray having a base oriented generally horizontally with at least one upstanding wall and a top opening for vertically receiving a plurality of items, said method comprising:
  a) accumulating a plurality items into a first group of longitudinally oriented items; then
  b) moving said first group of items in a first generally longitudinal direction; then
  c) moving the first group together in a first generally transverse direction to drop said first group of items in a generally vertically downward direction directly onto the generally horizontally oriented base of said tray through the top opening of said tray such that said first group of items is supported by said base; and then
  d) moving the tray loaded with the first group of items in a generally vertical direction.

23. A method as claimed in claim 22 wherein said plurality of items in said first group are arranged generally horizontally to form a horizontally oriented layer of items.

24. A method as claimed in claim 22 further comprising prior to (a):
  e) delivering a plurality of items generally horizontally in series to an accumulating station.

25. A method as claimed in claim 22 further comprising after (d):
  f) moving the tray loaded with said first group of items in a second generally longitudinal direction.

26. A method as claimed in claim 22 further comprising the steps:
  i) prior to (d), accumulating a plurality items into a second group of longitudinally oriented items; then
  ii) moving said second group in said first generally longitudinal direction; and
  iii) after (c) moving the second group of items together in said first transverse horizontal direction into a tray such that said second group is positioned generally above said first group
and wherein (d) comprises moving the tray loaded with both the first and second group of items in said generally vertical direction.

27. A method as claimed in claim 26 wherein said plurality of items in said first and second groups are arranged generally horizontally to form first and second layers of items.

28. A method as claimed in claim 26 further comprising prior to (a):
  e) delivering a plurality of items generally horizontally in series to an accumulating station such that said first group can be accumulated and then said second group can be accumulated.

29. A method as claimed in claim 26 further comprising after (d):
  e) moving the tray loaded with said first and second groups of items in a second generally longitudinal direction.

30. A method of loading first and second trays each with at least one layer of items each said tray having a base oriented generally horizontally with at least one upstanding wall and a top opening for vertically receiving a plurality of items, said method comprising:
  a) accumulating a plurality items into a first group and a second group; then
  b) moving said first group in a first generally longitudinal direction; then
  c) moving the first group in a first generally transverse direction to drop said first group of items in a generally vertically downward direction directly onto the generally horizontally oriented base of the first tray such that said first group is loaded through the top opening of the first tray into said first tray which is situated at an item loading station and is supported on said base; and then
  d) simultaneously moving (I) the first tray loaded with the first group of items in a vertical direction away from said item loading station, and (II) said second tray to said item loading station;
  e) moving said second group in said first generally longitudinal direction; then
  f) moving the second group in said first generally transverse direction to drop said second group of items in a generally vertically downward direction directly onto the generally horizontally oriented base of the second tray such that said second group is loaded through the top opening of the second tray into said second tray which is situated at said item loading station.

31. A method as claimed in claim 30 wherein said first and second groups of items comprise a plurality of longitudinally oriented items.

32. A method as claimed in claim 31 wherein said first longitudinal direction is generally horizontal.

33. A method as claimed in claim 32 wherein said first transverse direction is generally horizontal.

34. A method of loading a tray with at least one group of items, each said tray having a base oriented generally horizontally with at least one upstanding wall and a top opening for vertically receiving a plurality of items, said method comprising:

a) moving a first group comprising a plurality of items in a first generally longitudinal horizontal direction;

b) moving the first group in a first generally transverse horizontal direction to drop said first group of items in a generally vertically downward direction directly onto the generally horizontally oriented base of the tray such that said first group is loaded through said opening of said tray into said tray and is supported on said base; and c) moving the tray loaded with the first group of items in a generally vertical direction.

35. A method of loading a tray with at least one layer of items, each said tray having a base oriented generally horizontally with at least one upstanding wall and a top opening for vertically receiving a plurality of items, said method comprising:

a) accumulating a plurality of items into a first group;

b) moving said first group in a first generally longitudinal horizontal direction;

c) moving the first group in a first generally transverse horizontal direction to drop said first group of items in a generally vertically downward direction directly onto the generally horizontally oriented base of the tray such that said first group is loaded through the opening of said tray into said tray and is supported on said base; and d) moving the tray loaded with the first group of items in a generally vertical direction.

36. A system for loading a group of items into an open top tray each said tray having a base oriented generally horizontally with at least one upstanding wall and a top opening for vertically receiving a plurality of items, said system comprising:

a) an item accumulating conveyor operable to collect a plurality of items into a group at an item loading station and transport said group of items generally horizontally and longitudinally to a tray loading station;

b) a vertical tray delivery conveyor operable to move a tray with its base horizontally oriented thereon from an item loading position at which items are loaded from said item accumulating conveyor into said tray, generally vertically to a tray unloading position where said tray carrying said group of items is unloaded from said vertical tray delivery conveyor; and c) an item discharge apparatus operable to move said group of items from said item accumulating conveyor generally transversely horizontal and to discharge said group of items generally vertically downward directly onto the generally horizontally oriented base of said tray held in said vertical tray delivery conveyor through the top opening of said tray such that said group of items is supported on said base when said tray is at said item loading position.

37. A system as claimed in claim 36 wherein said vertical tray delivery conveyor is loaded with a tray at a first tray loading position, and said vertical tray delivery conveyor is operable to move said tray from said first tray loading position to said item loading position.

38. A system as claimed in claim 36 wherein said tray is moved by said vertical tray delivery conveyor from said tray loading position, generally vertically to said item loading position.

39. A system as claimed in claim 38 wherein said tray is unloaded at said tray unloading position generally transversely onto a tray output conveyor.

40. A system as claimed in claim 39 wherein said tray is unloaded at said tray unloading position generally transversely and vertically downward onto a tray output conveyor.

41. A system as claimed in claim 40 wherein said tray output conveyor is oriented generally horizontally and longitudinally.

42. A system as claimed in claim 36 wherein said vertical tray delivery conveyor is operable to move first, second and third trays oriented in series in longitudinal alignment from an item loading position at which a plurality of items comprising said group are loaded generally transversely from said item accumulating conveyor into each of said first, second and third trays, generally vertically to a tray unloading position where said first, second and third trays carrying said group of items are unloaded from said vertical tray delivery conveyor, and wherein said item discharge apparatus is operable to discharge said group of items generally transversely from said item accumulating conveyor to said first, second and third trays held in said vertical tray delivery conveyor when said first, second and third trays are at said item loading position.

43. A system as claimed in claim 42 wherein said item discharge apparatus is operable to discharge said plurality of items from said second group of items to positions above said plurality of items from said first group of items to form two layers of items in each of said first, second and third trays.

44. A system as claimed in claim 42 wherein said vertical tray delivery conveyor is loaded with said first, second and third trays oriented in series in longitudinal alignment at a first tray loading position, and said vertical tray delivery conveyor is operable to move said trays from said first tray loading position to said item loading position.

45. A system as claimed in claim 44 wherein said trays are moved by said vertical tray delivery conveyor from said tray loading position, generally vertically to said item loading position.

46. A system as claimed in claim 45 wherein said trays are unloaded at said tray unloading position generally transversely onto a tray output conveyor.

47. A system as claimed in claim 46 wherein said tray output conveyor is oriented generally longitudinally.

48. A system as claimed in claim 36 wherein said item accumulating conveyor is operable to collect a plurality of items into a first group at said item loading station and a plurality of items into a second group at said item loading station and transport said first group of items and then said second group of items, generally horizontally and longitudinally to a tray loading station, and wherein said item discharge apparatus is operable to discharge said first group of items generally transversely from said item accumulating conveyor into said tray held in said vertical tray delivery conveyor when said tray is at said item loading position, and then said item discharge apparatus is operable to discharge said second group of items generally transversely from said item accumulating conveyor into said tray held in said vertical tray delivery conveyor when said tray is at said item loading position.

49. A system as claimed in claim 48 wherein said item accumulating conveyor is operable to collect a plurality of items into a first group at said item loading station and a plurality of items into a second group at said item loading station and transport said first group of items and then said second group of items, generally horizontally and longitudinally to a tray loading station, and wherein said item discharge apparatus is operable to discharge a plurality of items of said first group of items generally transversely from said item accumulating conveyor into each of said first, second and third trays held in said vertical tray delivery conveyor when said trays are at said item loading position, and then said item discharge apparatus is operable to discharge a plurality of items of said second group of items generally transversely from said item accumulating conveyor into said trays held in said vertical tray delivery conveyor when said trays are at said item loading position.

50. A system as claimed in claim 36 wherein said vertical tray delivery conveyor has a plurality of shelves that move along a common conveyor path having a vertical run between said item loading position and said tray discharge position, each shelf for supporting first, second and third trays in generally longitudinal and horizontal alignment.

51. A system as claimed in claim 50 further comprising a tray stabilization apparatus for stabilizing the first, second and third trays during loading with items at said item loading position.

52. A system as claimed in claim 51 wherein said shelf has an end wall at one end thereof, and said stabilization apparatus comprises a plate mounted on a reciprocating piston, said piston operable to applying
   pressure through said plate to an end wall of a tray, such that said first, second and third trays are held securely between said end wall of said shelf and said plate, said piston operable to release said pressure when said first, second and third trays have been loaded with items.

53. A system as claimed in claim 36 further comprising a tray input conveyor operable to load a plurality of trays in series onto said vertical tray delivery conveyor, when said vertical tray delivery conveyor is at said tray loading position.

54. A system as claimed in claim 53 wherein said tray input conveyor operates continuously to deliver a plurality of trays to said vertical tray delivery conveyor, and further comprising a tray restraining apparatus configured to restrain trays on said tray input conveyor when said vertical tray delivery conveyor is not ready to receive a plurality of trays from said tray input conveyor, said tray restraining apparatus being configured to release a plurality of trays from said tray input conveyor when said vertical tray delivery conveyor is ready to receive a plurality of trays from said tray input conveyor.

55. A system as claimed in claim 54 wherein said tray restraining apparatus is configured to release a first batch comprising a plurality of trays, and then push backwards on said tray input conveyor a second batch comprising a plurality of trays, such that said second batch will not interfere with the movement of said vertical tray delivery conveyor from said tray loading position to said item loading position.

56. A system for loading a tray with a group of items, each said tray having a base oriented generally horizontally with at least one upstanding wall and a top opening for vertically receiving a plurality of items, said system comprising:
   a) means for moving a first group of items comprising a plurality of items in a first generally longitudinal horizontal direction;
   b) means for moving the first group in a first generally transverse horizontal direction to drop said first group of items in a generally vertically downward direction directly onto the generally horizontally oriented base of the tray such that said first group is loaded through the opening of said tray into said tray and is supported on said base; and
   c) means for moving the tray loaded with said first group of items in a generally vertical direction.

\* \* \* \* \*